US00RE48327E

(19) United States
(12) Reissued Patent
Yang et al.

(10) Patent Number: US RE48,327 E
(45) Date of Reissued Patent: Nov. 24, 2020

(54) METHOD FOR TRANSMITTING CONTROL INFORMATION AND APPARATUS FOR SAME

(71) Applicant: LG ELECTRONICS INC., Seoul (KR)

(72) Inventors: Suckchel Yang, Anyang-si (KR); Mingyu Kim, Anyang-si (KR); Joonkui Ahn, Anyang-si (KR); Dongyoun Seo, Anyang-si (KR)

(73) Assignee: LG ELECTRONICS INC., Seoul (KR)

(21) Appl. No.: 15/595,323

(22) Filed: May 15, 2017

Related U.S. Patent Documents

Reissue of:
(64) Patent No.: 9,167,576
Issued: Oct. 20, 2015
Appl. No.: 14/122,125
PCT Filed: Jun. 11, 2012
PCT No.: PCT/KR2012/004598
§ 371 (c)(1),
(2) Date: Nov. 25, 2013
PCT Pub. No.: WO2012/169859
PCT Pub. Date: Dec. 13, 2012

U.S. Applications:
(63) Continuation of application No. 15/590,322, filed on May 9, 2017, now Pat. No. Re. 48,004, which is an application for the reissue of Pat. No. 9,167,576.
(Continued)

(51) Int. Cl.
*H04W 4/00* (2018.01)
*H04W 72/04* (2009.01)
(Continued)

(52) U.S. Cl.
CPC ..... *H04W 72/042* (2013.01); *H04L 1/0026* (2013.01); *H04L 1/0057* (2013.01);
(Continued)

(58) Field of Classification Search
CPC ..... H04L 1/00; H04L 1/0693; H04L 1/1671; H04L 1/0057; H04L 1/0026;
(Continued)

(56) References Cited

U.S. PATENT DOCUMENTS 8,665,813 B2 * 3/2014 Golitschek Edler Von Elbwart ..... H04L 1/0026 370/329
9,167,576 B2 * 10/2015 Yang ..... H04L 5/001
(Continued)

FOREIGN PATENT DOCUMENTS

KR 10-2008-0029912 A 4/2008
WO WO 2010/101409 A2 9/2010
WO WO 2011/053970 A2 5/2011

OTHER PUBLICATIONS

CATR, "Periodic CQI Feedback on PUCCH for LTE-A," 3GPP TSG RAN WG1 Meeting #63, R1-106271, Jacksonville, USA, Nov. 15-19, 2010, 2 pages.
(Continued)

*Primary Examiner* — David E England
(74) *Attorney, Agent, or Firm* — Birch, Stewart, Kolasch & Birch, LLP

(57) ABSTRACT

The present invention relates to a wireless communication system. More particularly, the present invention relates to a method for transmitting uplink channel state information (CSI) in a wireless communication system that supports carrier aggregation, and to an apparatus for the method. The method for reporting CSI in a wireless communication system that supports carrier aggregation comprises the steps of: configuring a plurality of downlink component carriers (DL CCs); setting a CSI report mode on the plurality of DL CCs for each DL CC; and performing an operation for transmitting CSI according to the CSI report mode set on each DL CC. If a P-number of CSI overlap in the same
(Continued)

subframe and a first condition is satisfied, a Q-number of CSI among the P-number of CSI are transmitted through a first physical channel, and if the P-number of SCI overlap in the same subframe and a second condition is satisfied, only an R-number of CSI among the P-number of CSI are transmitted through a second physical channel which is different from the first physical channel, wherein R is smaller than Q.

20 Claims, 13 Drawing Sheets

Related U.S. Application Data

(60) Provisional application No. 61/554,478, filed on Nov. 1, 2011, provisional application No. 61/495,388, filed on Jun. 10, 2011.

(51) Int. Cl.

| | |
|---|---|
| ***H04W 24/10*** | (2009.01) |
| ***H04L 5/00*** | (2006.01) |
| ***H04L 1/00*** | (2006.01) |
| ***H04L 1/16*** | (2006.01) |

(52) U.S. Cl.
CPC ..... *H04L 1/0068* (2013.01); *H04L 1/1621* (2013.01); *H04L 1/1664* (2013.01); *H04L 1/1671* (2013.01); *H04L 5/001* (2013.01); *H04L 5/0057* (2013.01); *H04W 24/10* (2013.01)

(58) Field of Classification Search
CPC ... H04L 1/1621; H04L 1/0068; H04L 1/1664; H04L 5/0057; H04L 5/001; H04B 7/0626; H04W 72/042; H04W 24/10
See application file for complete search history.

(56) References Cited

U.S. PATENT DOCUMENTS

| | | | | |
|---|---|---|---|---|
| 9,706,505 | B2 * | 7/2017 | Pietraski | H04W 52/40 |
| 9,819,458 | B2 * | 11/2017 | Chen | H04L 1/0015 |
| 10,499,347 | B2 * | 12/2019 | Pietraski | H04W 52/367 |
| 2005/0232156 | A1 | 10/2005 | Kim et al. | H04L 1/0029 370/236 |
| 2010/0098012 | A1 * | 4/2010 | Bala et al. | H04W 72/0446 370/329 |
| 2011/0103247 | A1 | 5/2011 | Chen et al. | H04B 7/0452 370/252 |
| 2011/0249578 | A1 * | 10/2011 | Nayeb Nazar et al. | H04W 74/0841 370/252 |
| 2011/0317652 | A1 | 12/2011 | Kim et al. | H04L 5/001 370/329 |
| 2012/0220286 | A1 * | 8/2012 | Chen et al. | H04W 24/10 455/422.1 |
| 2015/0223178 | A1 * | 8/2015 | Pietraski | H04W 72/0413 370/252 |

OTHER PUBLICATIONS

3rd Generation Partnership Project, "Technical Specification Group Radio Access Network; Evolved Universal Terrestrial Radio Access (E-UTRA); Physical Layer Procedures (Release 10)," 3GPP TS 36.213, V10.1.0, Mar. 2011, pp. 1-115.

* cited by examiner

FIG. 8
| CQI report mode | | PMI feedback type | |
|---|---|---|---|
| | | PMI No | Single PMI |
| PUCCH CQI feedback type | Wideband (wideband CQI) | Mode 1-0 | Mode 1-1 |
| | UE-selected (subband CQI) | Mode 2-0 | Mode 2-1 |
FIG. 9
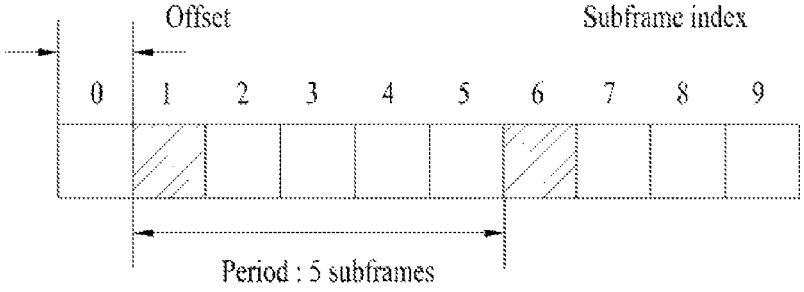
FIG. 10
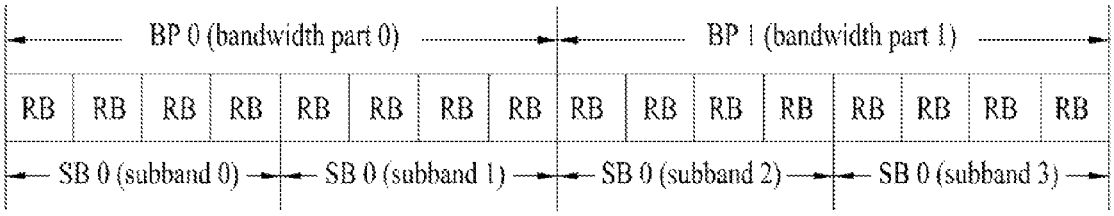

METHOD FOR TRANSMITTING CONTROL INFORMATION AND APPARATUS FOR SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

[This non-provisional application is a National Stage entry under U.S.C. §371 of International Application No. PCT/KR2012/004598 filed on Jun. 11, 2012, which claims the benefit of U.S. Provisional Application Nos. 61/495,388 filed on Jun. 10, 2011 and 61/554,478 filed on Nov. 1, 2011. The entire contents of all of the above applications are hereby incorporated by reference.] *This Application is a Continuation Reissue Application of U.S. patent application Ser. No. 15/590,322 filed on May 9, 2017 (now U.S. Pat. No. RE48,004 issued on May 19, 2020), which is a Reissue Application of U.S. Pat. No. 9,167,576 issued on Oct. 20, 2015, which is the National Phase of PCT International Application No. PCT/KR2012/004598 filed on Jun. 11, 2012, which claims the priority benefit under 35 U.S.C. § 119(e) to U.S. Provisional Application Nos. 61/554,478 filed on Nov. 1, 2011 and 61/495,388 filed on Jun. 10, 2011, all of which are hereby expressly incorporated by reference into the present application. More than one reissue application has been filed for the reissue of U.S. Pat. No. 9,167,576: the present application and U.S. patent application Ser. No. 15/590,322.*

TECHNICAL FIELD

The present invention relates to a wireless communication system, and more particularly, to a method for transmitting control information and an apparatus for the same.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the present invention devised to solve the conventional problem is to provide a method for efficiently transmitting control information in a wireless communication system and an apparatus for the same. Another object of the present invention is to provide a method for efficiently transmitting uplink control information (for example, channel state information) and efficiently managing resources for the uplink control information in a system in which a plurality of carriers or cells are aggregated, and an apparatus for the same.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In one aspect of the present invention, a method for reporting channel state information (CSI) in a wireless communication system that supports carrier aggregation comprises the steps of configuring a plurality of downlink component carriers (DL CCs); setting a CSI report mode on the plurality of DL CCs for each DL CC; and performing an operation for transmitting CSI in accordance with the CSI report mode set on each DL CC, wherein, if a P-number of CSIs overlap with one another for the same subframe and a first condition is satisfied, a Q-number of CSIs among the P-number of CSIs are transmitted through a first physical channel, and if the P-number of CSIs overlap with one another for the same subframe and a second condition is satisfied, only an R-number of CSIs among the P-number of CSI are transmitted through a second physical channel which is different from the first physical channel, R being smaller than Q.

In another aspect of the present invention, a communication apparatus configured to report channel state information (CSI) in a wireless communication system that supports carrier aggregation comprises a radio frequency (RF) unit; and a processor, wherein the processor configures a plurality of downlink component carriers (DL CCs), sets a CSI report mode on the plurality of DL CCs for each DL CC, and performs an operation for transmitting CSI in accordance with the CSI report mode set on each DL CC, and if a P-number of CSIs overlap with one another for the same subframe and a first condition is satisfied, a Q-number of CSIs among the P-number of CSIs are transmitted through a first physical channel, and if the P-number of CSIs overlap with one another for the same subframe and a second condition is satisfied, only an R-number of CSIs among the P-number of CSI are transmitted through a second physical channel which is different from the first physical channel, R being smaller than Q.

Preferably, the first condition includes that P is more than M, the second condition includes that P is less than M, P and Q are the same as each other, and M is the minimum number of CSIs allowed for simultaneous transmission through the first physical channel.

Preferably, the first condition includes that P is more than L, the second condition includes that P is less than M, P is greater than Q, Q is the same as L, L is the maximum number of CSIs allowed for simultaneous transmission through the first physical channel, and M is the minimum number of CSIs allowed for simultaneous transmission through the first physical channel.

Preferably, the first condition includes that a size sum of the P number of CSIs is more than M, the second condition includes that a size sum of the P number of CSIs is less than M, P is the same as Q, R is the number of CSIs, which has the highest priority among the P number of CSIs and a size sum of CSIs of maximum integer less than S, M is a minimum size of CSI allowed for simultaneous transmission through the first physical channel, and S is an integer less than M determined in accordance with capacity of the second physical channel.

Preferably, the first condition includes that a size sum of the P number of CSIs is more than L, the second condition includes that a size sum of the P number of CSIs is less than M, P is greater than Q, Q is the number of CSIs, which has the highest priority among the P number of CSIs and a size sum of CSIs of maximum integer less than L, R is the number of CSIs, which has the highest priority among the P number of CSIs and a size sum of CSIs of maximum integer less than S, L is a maximum size of CSI allowed for simultaneous transmission through the first physical channel, M is a minimum size of CSI allowed for simultaneous transmission through the first physical channel, and S is an integer less than M determined in accordance with capacity of the second physical channel.

Advantageous Effects

According to the present invention, control information may efficiently be transmitted in the wireless communication system. In more detail, uplink control information (for example, channel state information) may efficiently be transmitted in a system where a plurality of carriers or cells are aggregated, and resources for the uplink control information may be managed efficiently.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 8 to 11 are diagrams illustrating periodic report of channel state information on a single carrier or cell;

BEST MODE FOR CARRYING OUT THE INVENTION

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A $3^{rd}$ generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, the following embodiments will be described based on that technical features of the present invention are applied to the 3GPP LTE/LTE-A. However, it is to be understood that the technical spirits of the present invention are not limited to the 3GPP LTE/LTE-A. Also, specific terminologies used hereinafter are provided to assist understanding of the present invention, and various modifications may be made in the specific terminologies within the range that does not depart from the technical spirits of the present invention.

In a wireless communication system, a user equipment receives information from a base station through a downlink (DL), and also transmits information to the base station through an uplink (UL). Examples of information transmitted from or received in the base station and the user equipment include data and various kinds of control information, and various physical channels exist depending on a type and usage of the information transmitted from or received in the base station and the user equipment.

Figure 1:
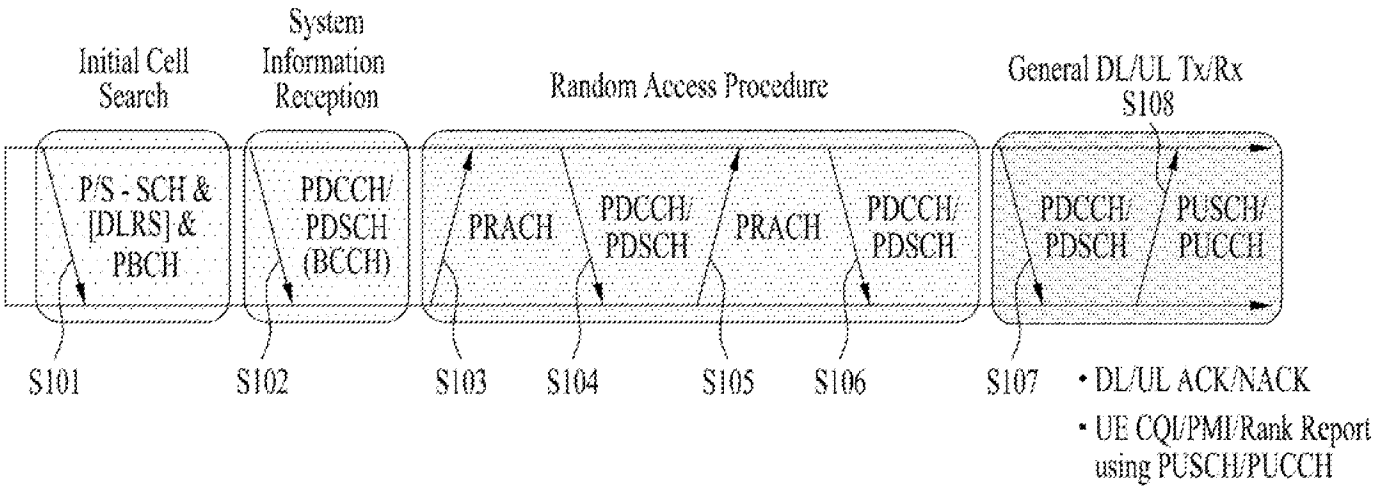
FIG. 1 is a diagram illustrating physical channels used in a 3GPP system and a general method for transmitting a signal using the physical channels.

FIG. 1 is a diagram illustrating physical channels used in a 3GPP LTE system and a general method for transmitting a signal using the physical channels.

The user equipment performs initial cell search such as synchronizing with the base station when it newly enters a cell or the power is turned on at step S101. To this end, the user equipment synchronizes with the base station by receiving a primary synchronization channel (P-SCH) and a secondary synchronization channel (S-SCH) from the base station, and acquires information such as cell ID, etc.

Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S102.

Afterwards, the user equipment may perform a random access procedure (RACH) such as steps S103 to S106 to complete access to the base station. To this end, the user equipment may transmit a preamble through a physical random access channel (PRACH) (S103), and may receive a response message to the preamble through the PDCCH and the PDSCH corresponding to the PDCCH (S104). In case of a contention based RACH, the user equipment may perform a contention resolution procedure such as transmission (S105) of additional physical random access channel and reception (S106) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S107) and transmit a physical uplink shared channel (PUSCH) and a physical uplink control channel (PUCCH) (S108), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CQI (Channel Quality Information), a PMI (Precoding Matrix Indicator), RI (Rank Indication), etc. Although the UCI is periodically transmitted through the PUCCH in the LTE system, it may be transmitted through the PUSCH if control information and traffic data should be transmitted at the same time. Also, the user equipment may non-periodically transmit the UCI through the PUSCH in accordance with request/command of the network.

Figure 2:
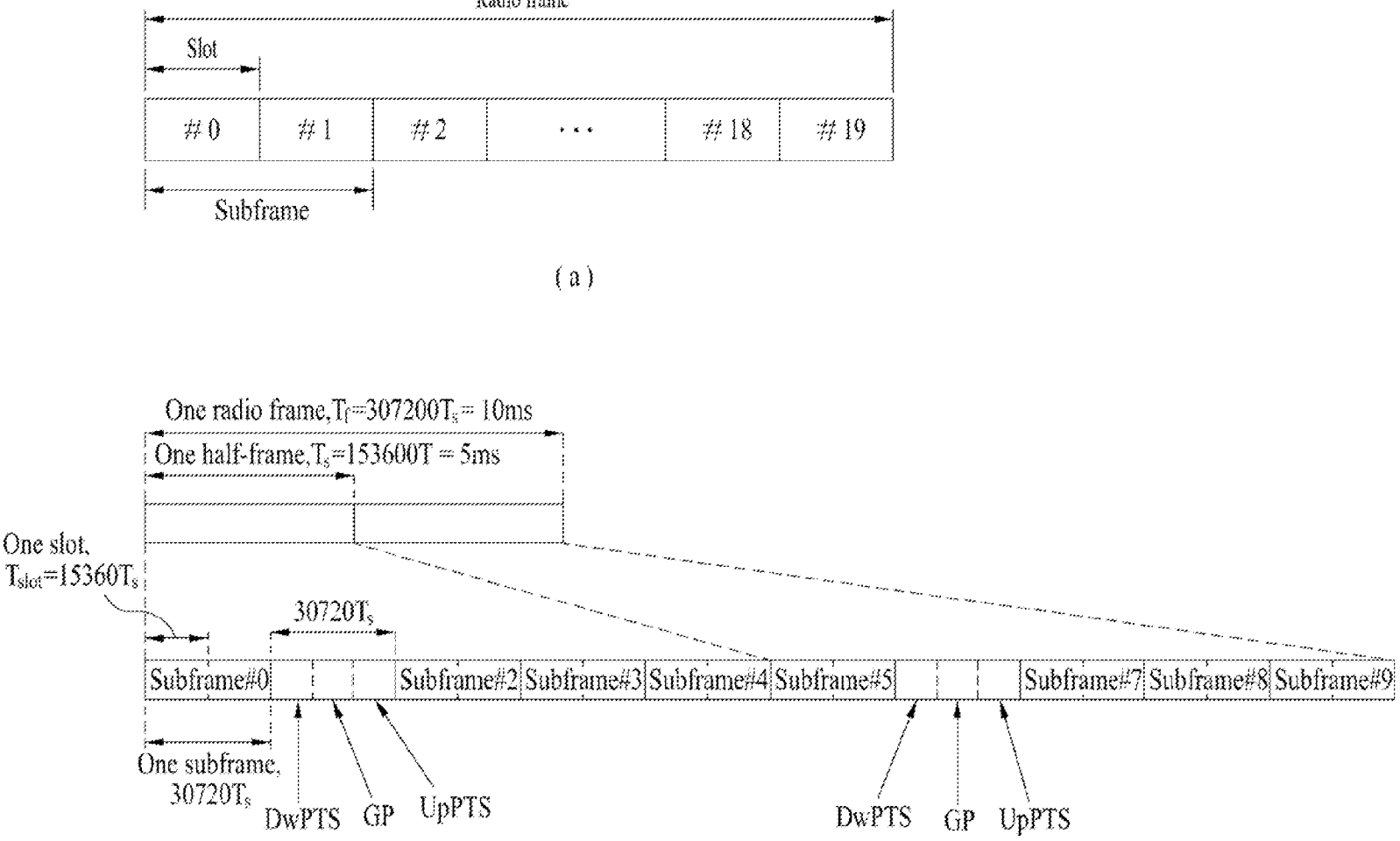
FIG. 2 is a diagram illustrating a structure of a radio frame.

FIG. 2 is a diagram illustrating a structure of a radio frame. The radio frame includes a plurality of subframes, each of which includes a plurality of OFDM or SC-FDMA symbols. The 3GPP LTE(-A) standard supports a type 1 radio frame structure for frequency division duplex (FDD) and a type 2 radio frame structure for time division duplex (TDD).

FIG. 2(a) is a diagram illustrating a structure of a type 1 radio frame. The downlink radio frame includes 10 subframes, each of which includes two slots in a time domain. For example, one subframe may have a length of 1 ms, and one slot may have a length of 0.5 ms. One slot includes a plurality of OFDM symbols or a plurality of SC-FDMA symbols in a time domain, and includes a plurality of resource blocks (RBs) in a frequency domain. The 3GPP LTE(-A) system uses OFDMA on a downlink and SC-FDMA on an uplink.

FIG. 2(b) is a diagram illustrating a structure of a type 2 radio frame. The type 2 radio frame includes two half frames, each of which includes four normal subframes and one special subframe. The special subframe includes a downlink pilot time slot (DwPTS), a guard period (GP), and an uplink pilot time slot (UpPTS). The DwPTS is used for initial cell search, synchronization or channel estimation at the user equipment. The UpPTS is used to synchronize channel estimation at the base station with uplink transmission of the user equipment. Also, the guard period provides switching time between UL transmission and DL transmission. Each normal subframe within the radio frame is used for UL transmission or DL transmission in accordance with uplink-downlink (UL-DL) configuration.

Figure 3:
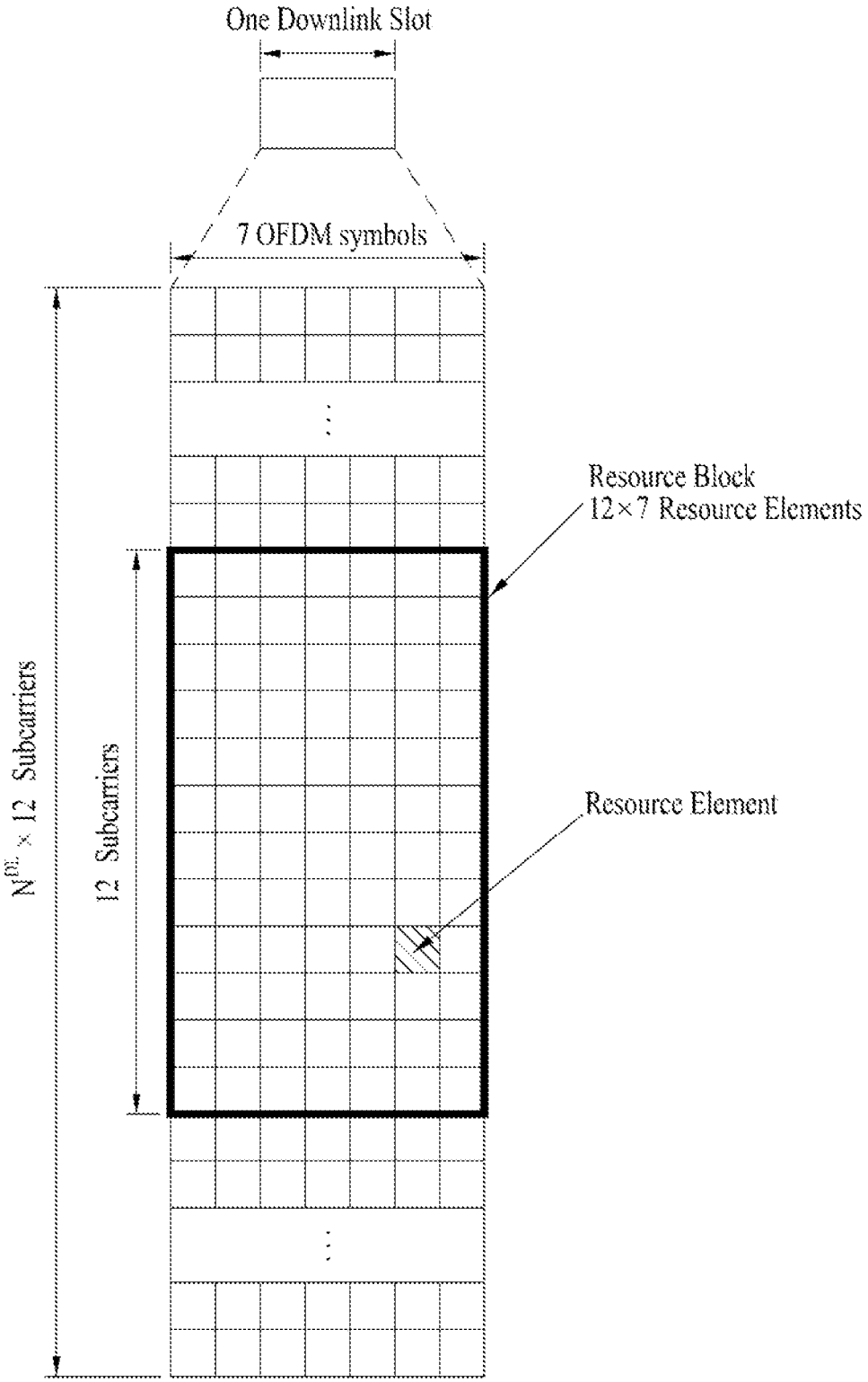
FIG. 3 is a diagram illustrating a resource grid of a downlink slot.

FIG. 3 is a diagram illustrating a resource grid of a downlink slot. A structure of an uplink slot is the same as that of the downlink slot except that OFDM symbols are replaced with SC-FDMA symbols.

Referring to FIG. 3, the downlink slot includes a plurality of OFDM symbols in a time domain. The downlink slot may include seven (six) OFDM symbols, and a resource block may include twelve subcarriers in a frequency domain. Each element on the resource grid will be referred to as a resource element (RE). One resource block (RB) includes 12×7(6) resource elements. The number $N_{RB}$ of resource blocks (RBs) included in the downlink slot depends on a downlink transmission bandwidth.

Figure 4:
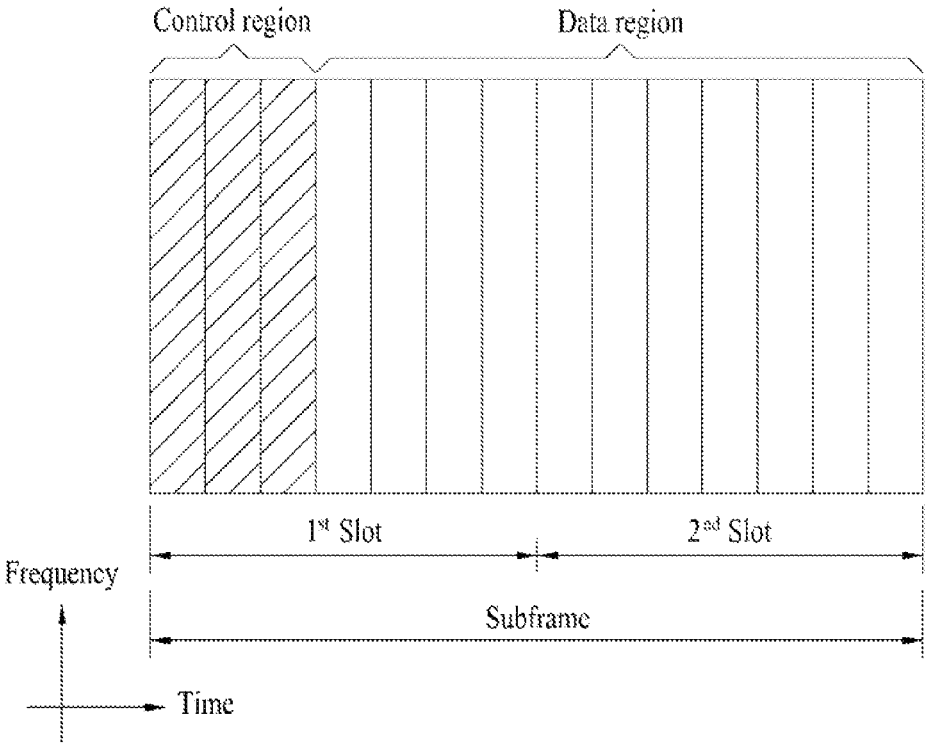
FIG. 4 is a diagram illustrating a structure of a downlink subframe.

FIG. 4 is a diagram illustrating a structure of a downlink subframe.

Referring to FIG. 4, maximum three (four) OFDM symbols located at the front of the first slot of the subframe correspond to a control region to which a control channel is allocated. The other OFDM symbols correspond to a data region to which a physical downlink shared channel (PDSCH) is allocated. Examples of the downlink control channel used in the LTE include a PCFICH (Physical Control Format Indicator CHannel), a PDCCH (Physical Downlink Control CHannel), and a PHICH (Physical Hybrid ARQ Indicator CHannel). The PCFICH is transmitted at the first OFDM symbol of the subframe, and carries information on the number of OFDM symbols used for transmission of the control channel within the subframe. The PHICH carries HARQ ACK/NACK (acknowledgement/negative-acknowledgement) signal in response to uplink transmission. The PDCCH carries transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission power control commands of individual user equipments (UEs) within a user equipment group, a transmission power control command, activity indication information of voice over Internet protocol (VoIP), etc.

Figure 5:
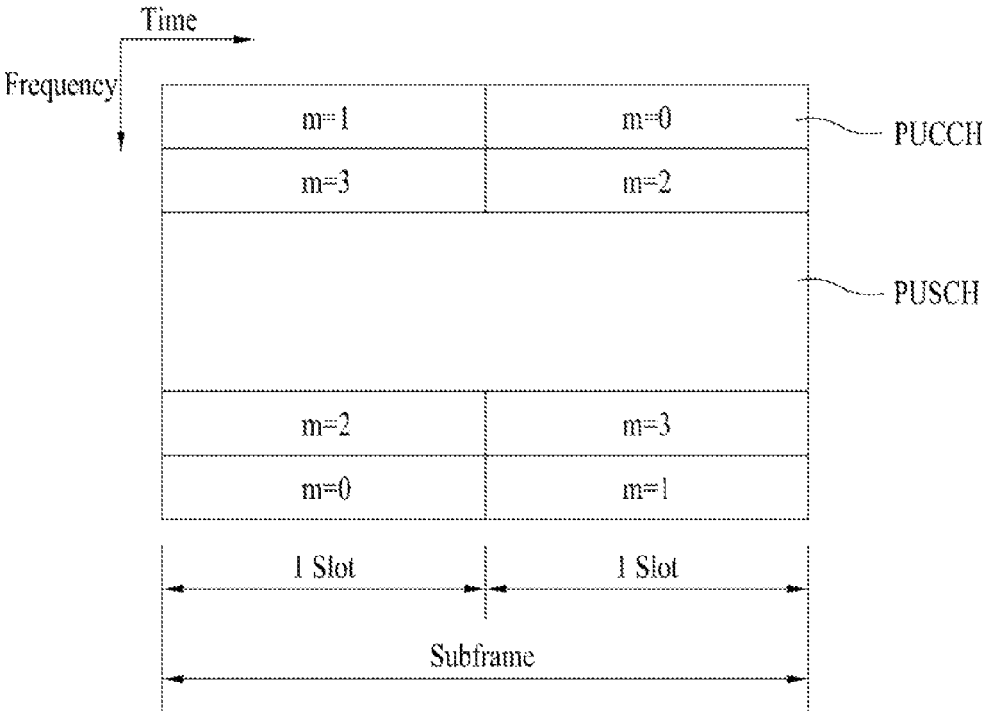
FIG. 5 is a diagram illustrating a structure of an uplink subframe.

FIG. 5 is a diagram illustrating a structure of an uplink subframe in an LTE system.

Referring to FIG. 5, the uplink subframe includes a plurality of slots (for example, two). Each slot may include a plurality of SC-FDMA symbols, wherein the number of SC-FDMA symbols included in each slot is varied depending on a cyclic prefix (CP) length. The uplink subframe is divided into a data region and a control region in a frequency domain. The data region includes a PUSCH, and is used to transmit a data signal such as voice. The control region includes a PUCCH, and is used to transmit uplink control information (UCI). The PUCCH includes RB pair located at both ends of the data region on a frequency axis, and performs hopping on the border of the slots.

The PUCCH may be used to transmit the following control information.

SR (Scheduling Request): is information used to request uplink UL-SCH resource. The SR is transmitted using an on-off keying (OOK) system.

HARQ ACK/NACK: is a response signal to a downlink data packet on the PDSCH. It represents whether the downlink data packet has been successfully received. ACK/NACK 1 bit is transmitted in response to a single downlink codeword (CW), and ACK/NACK 2 bits are transmitted in response to two downlink codewords.

CSI (Channel State Information): is feedback information on a downlink channel. The CSI includes a channel quality indicator (CQI), a rank indicator (RI), a precoding matrix indicator (PMI), and a precoding type indicator (PTI). 20 bits are used per subframe.

The quantity of the uplink control information (UCI) that may be transmitted from the user equipment for the subframe depends on the number of SC-FDMA symbols available for control information transmission. The SC-FDMA symbols available for control information transmission mean the remaining SC-FDMA symbols except for SC-FDMA symbols for reference signal transmission for the subframe, and the last SC-FDMA symbol of the subframe is excluded in case of the subframe for which a sounding reference signal (SRS) is set. The reference signal is used for coherent detection of the PUCCH. The PUCCH supports seven formats in accordance with information which is transmitted.

Table 1 illustrates a mapping relation between the PUCCH format and the UCI in the LTE(-A) system.

TABLE 1

| PUCCH format | Uplink control information (UCI) |
|---|---|
| Format 1 | SR (Scheduling Request) (non-modulated waveform) |
| Format 1a | 1-bit HARQ ACK/NACK with/without SR |
| Format 1b | 2-bit HARQ ACK/NACK with/without SR |
| Format 2 | CSI (20 coded bits) |
| Format 2 | CSI and 1- or 2-bit HARQ ACK/NACK (20 bits) for extended CP only |
| Format 2a | CSI and 1-bit HARQ ACK/NACK (20 + 1 coded bits) |
| Format 2b | CSI and 2-bit HARQ ACK/NACK (20 + 2 coded bits) |
| Format 3 (LTE-A) | HARQ ACK/NACK (+SR) (48 bits) |

Since the LTE user equipment cannot transmit the PUCCH and the PUSCH at the same time, if UCI (for example, CQI/PMI, HARQ-ACK, RI, etc.) transmission is required for the subframe for which the PUSCH is transmitted, the user equipment multiplexes the UCI in the PUSCH region. For example, if the user equipment should transmit HARQ-ACK for the subframe for which PUSCH transmission is allocated, the user equipment multiplexes UL-SCH data and HARQ-ACK before DFT-spreading and then transmits control information and data through the PUSCH.

Figure 6:
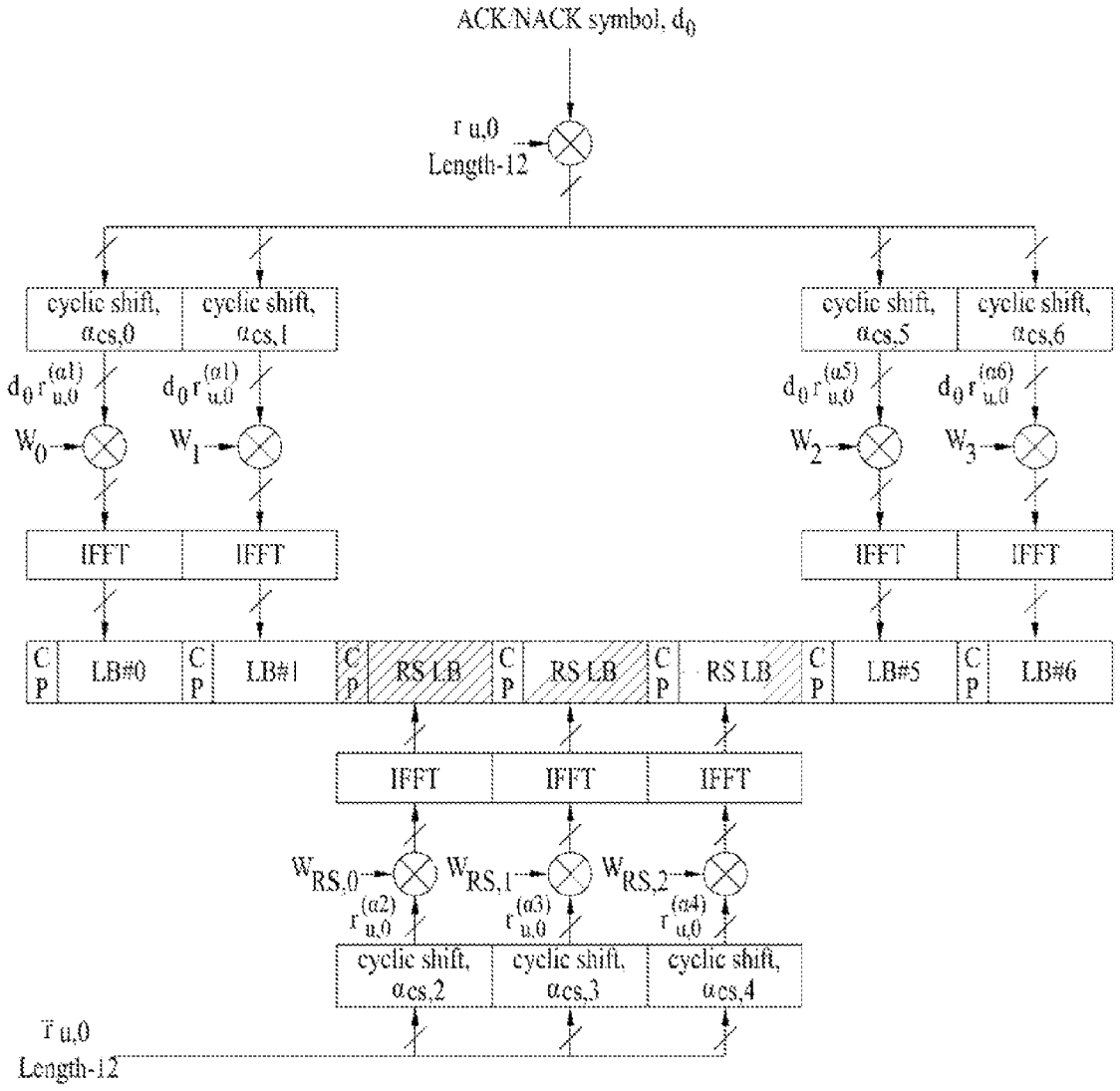
FIG. 6 is a diagram illustrating a structure of a slot level of PUCCH formats 1/1a/1b.

FIG. 6 is a diagram illustrating a structure of a slot level of PUCCH formats 1/1a/1b. The PUCCH format 1 is used for SR transmission, and the PUCCH formats 1a/1b are used for ACK/NACK transmission. In case of normal CP, SC-FDMA #2/#3/#4 are used for transmission of DM RS (Demodulation Reference Signal). In case of extended CP, SC-FDMA #2/#3 are used for transmission of DM RS.

Referring to FIG. 6, ACK/NACK information of 1 bit and ACK/NACK information of 2 bits are respectively modulated in accordance with a binary phase shift keying (BPSK) modulation scheme and a quadrature phase shift keying (QPSK) modulation scheme, and one ACK/NACK modulation symbol ($d_0$) is generated. The ACK/NACK information is set to 1 in case of positive ACK, whereas the ACK/NACK information is set to 0 in case of negative ACK (NACK). A cyclic shift (CS) ($\alpha_{cs,x}$) is applied to the PUCCH formats 1a/1b in the frequency domain, and orthogonal spreading codes (for example, Walsh-Hadamard or DFT codes) $w_0,w_1,w_2,w_3$ are applied thereto in the time time domain. In case of the PUCCH formats 1a/1b, since code multiplexing is used in both the frequency domain and the time domain, more user equipments may be multiplexed on the same PUCCH RB.

The RS transmitted from different user equipments are multiplexed using the same method as that of the UCI. The number of cyclic shifts supported by the SC-FDMA symbols for PUCCH ACK/NACK RB may be configured by a cell-specific higher layer signaling parameter $A_{shift}^{PUCCH}$. $\Delta_{shift}^{PUCCH}\in\{1, 2, 3\}$ represents that shift values are 12, 6 and 4, respectively. The number of spreading codes that may actually be used for ACK/NACK in time-domain CDM may be limited by the number of RS symbols. This is because that multiplexing capacity of the RS symbols is smaller than that of UCI symbols due to a small number of RS symbols.

Figure 7:
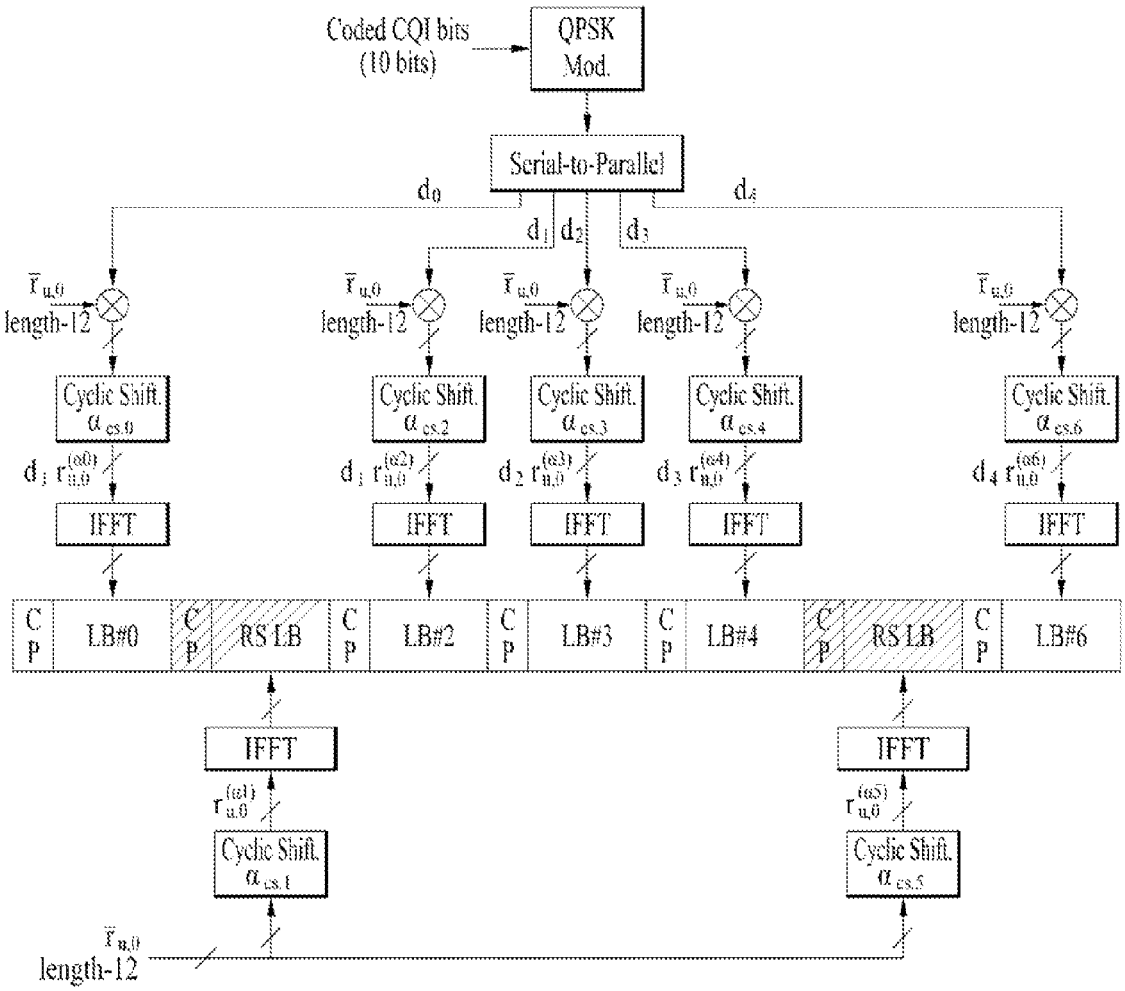
FIG. 7 is a diagram illustrating a structure of a slot level of PUCCH formats 2/2a/2b.
Figure 11:
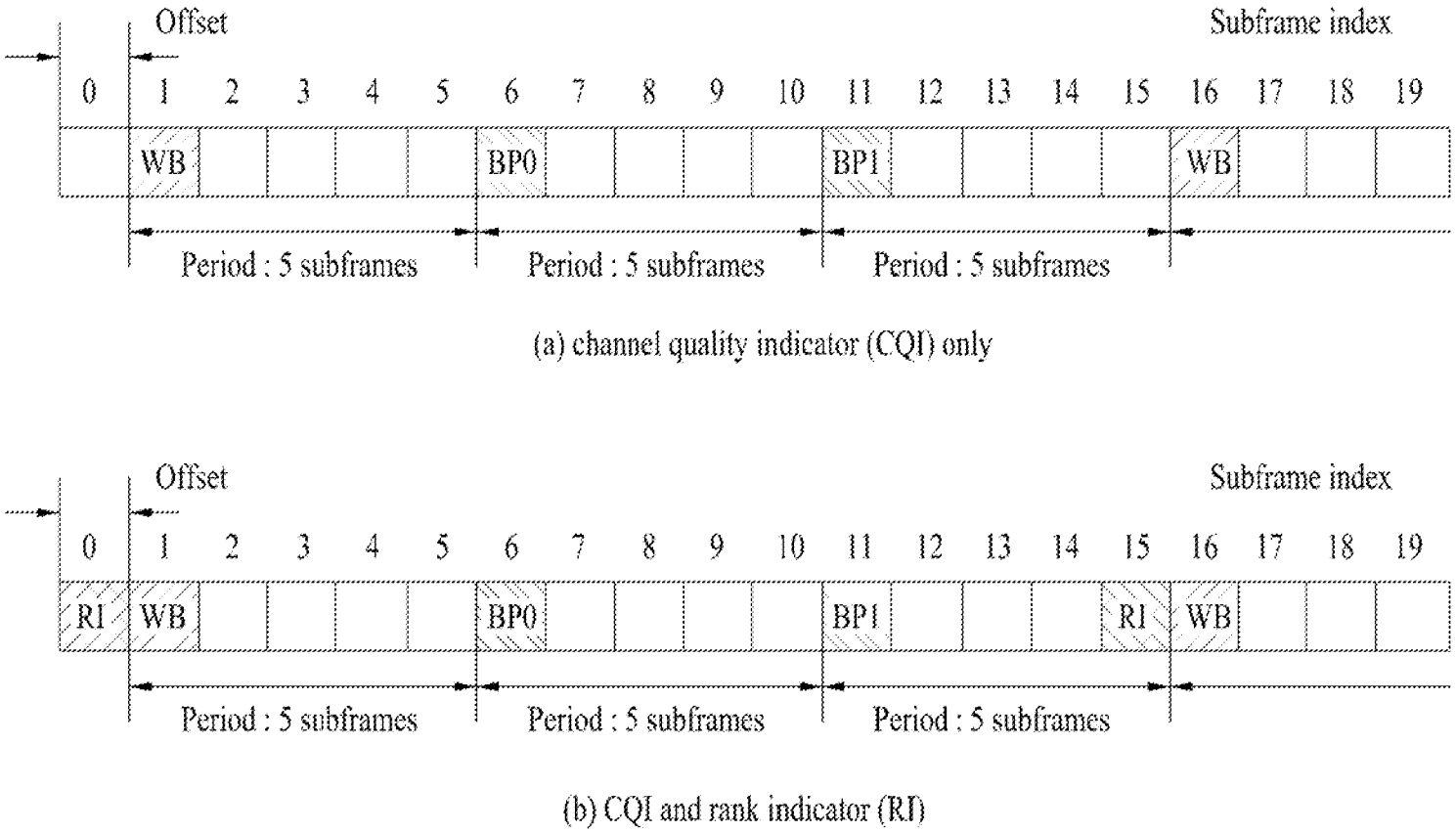

FIG. 7 is a diagram illustrating a structure of a slot level of PUCCH formats 2/2a/2b. The PUCCH formats 2/2a/2b are used for CSI (channel state information) transmission. The CSI includes CQI, PMI, RI, etc. In case of normal cyclic prefix (CP), SC-FDMA #1 and #5 are used for transmission of demodulation reference signal (DM RS) within the slot. In case of extended CP, SC-FDMA symbol (LB) #3 is only used for transmission of the DM RS within the slot.

Referring to FIG. 7, CCI of 10 bits is channel coded to 20 coded bits using rate ½ punctured (20, k) Reed-Muller codes at a subframe level (not shown). Afterwards, the coded bits are mapped into quadrature phase shift keying (QPSK) constellation (QPSK modulation) through scramble (not shown). Scramble may be performed using length-31 gold sequence similarly to PUSCH data. Ten QPSK modulation symbols are generated and five QPSK modulation symbols $d_0$~$d_4$ are transmitted from each slot through corresponding SC-FDMA symbols. Each of the QPSK modulation symbols is used to modulate a length-12 base RS sequence ($r_{u,O}$) prior to inverse fast fourier transform (IFFT). Consequently, the RS sequence is cyclic-shifted in the time domain in accordance with the values of the QPSK modulation symbols ($d_x*r_{u,O}$, x=0~4). The RS sequence multiplied by the QPSK modulation symbols is cyclic-shifted ($\alpha_{cs,x}$, x=1, 5). If the number of cyclic shifts is N, N number of user equipments may be multiplexed on the same CSI PUCCH RB.

FIGS. 8 to 11 are diagrams illustrating periodic report of channel state information on a single carrier or cell. In other words, FIGS. 8 to 11 illustrate periodic report of channel state information on a single carrier or cell. Parameters/resources for periodic report of the CSI (for example, CQI) are configured semi-statically by higher layer (for example, RRC (radio resource control)) signaling. For example, if a PUCCH resource index $n_{PUCCH}^{(2)}$ is set for CSI transmission, the CSI is transmitted periodically on a CSI PUCCH linked with the PUCCH resource index $n_{PUCCH}^{(2)}$. The PUCCH resource index $n_{PUCCH}^{(2)}$ indicates cyclic shift ($\alpha_{cs}$) and PUCCH RB.

Referring to FIG. 8, four types of CQI report modes exist in the LTE system. In more detail, the CQI report modes may be divided into a wideband (WB) CQI report mode and a subband (SB) CQI mode in accordance with CQI feedback type, and may be divided into a non-PMI report mode and a single PMI report mode in accordance with PMI transmission. Each user equipment receives information obtained by combination of period and offset through RRC signaling to periodically report CQI.

FIG. 9 illustrates an example of channel state information transmitted if information indicating {period '5', offset '1'} is signaled to the user equipment. Referring to FIG. 9, if information indicating a period of '5' and offset of '1' is signaled to the user equipment, the user equipment transmits the channel state information in a unit of five subframes at offset of a subframe in an increasing direction of subframe index from the $0^{th}$ subframe. Although the channel state information is basically transmitted through the PUCCH, if the PUSCH for data transmission exists at the same time, the channel state information is transmitted together with data through the PUSCH. The subframe index is comprised by combination of system frame number $n_f$ and slot index ($n_s$, 0~19). Since the subframe includes two slots, the subframe index may be defined as $10*n_f+\text{floor}(n_s/2)$. floor( )represents a floor function.

There exist a type for transmitting WB CQI only and a type for transmitting both WB CQI and SB CQI. In case of the type for transmitting WB CQI only, CQI for the entire band is transmitted for a subframe corresponding to every CQI transmission period. Meanwhile, as shown in FIG. 8, if PMI should be transmitted in accordance with a PMI feedback type, PMI information is transmitted together with CQI. In case of the type for transmitting WB CQI and SB CQI, WB CQI and SB CQI are transmitted alternately.

FIG. 10 illustrates a system of which system band includes 16 RBs. In this case, it is assumed that the system band includes two bandwidth parts (BPs) (BP0, BP1), each of which includes two subbands (SBs) (SB0, SB1), each of which includes four RBs. This assumption is exemplary for description, wherein the number of BPs and a size of each BP may be varied depending on the size of the system band. Also, the number of SBs constituting each BP may be varied depending on the number of RBs, the number of BPs and the size of the SB.

In case of the type for transmitting both WB CQI and SB CQI, WB CQI is transmitted for the first CQI transmission subframe, and CQI of SB having good channel status from SB0 and SB1, which belong to BP0, and index of the corresponding SB are transmitted for next CQI transmission subframe. Afterwards, CQI of SB having good channel status from SB0 and SB1, which belong to BP1, and index of the corresponding SB are transmitted for next CQI transmission subframe. In this way, after WB CQI is transmitted, CQI for each BP is transmitted in due order. CQI for each BP may be transmitted in due order once to four times between two WB CQIs. For example, if CQI is transmitted in due order once between two WB CQIs, the CQI may be transmitted in the order of WB CQI⇒ BP0 CQI⇒ BP1 CQI⇒ WB CQI. Also, if CQI is transmitted in due order four times between two WB CQIs, the CQI may be transmitted in the order of WB CQI⇒ BP0 CQI⇒ BP1 CQI⇒ BP0 CQI⇒ BP1 CQI⇒ BP0 CQI⇒ BP1 CQI⇒ BP0 CQI⇒ BP1 CQI⇒ WB CQI. Information as to how many times CQI for each BP is transmitted in due order is signaled from a higher layer (for example, RRC layer).

FIG. 11(a) illustrates that both WB CQI and SB CQI are transmitted if information indicating {period of '5', offset of '1'} is signaled to the user equipment. Referring to FIG. 11(a), CQI may be transmitted for the subframe only corresponding to the signaled period and offset regardless of a type. FIG. 11(b) illustrates that RI is additionally transmitted in case of FIG. 11(a). RI may be signaled from the higher layer (for example, RRC layer) by combination of a transmission period indicating what multiple of WB CQI transmission period is used to transmit RI and offset at the transmission period of RI. Offset of RI is signaled at a relative value of offset of CQI. For example, if offset of CQI is '1' and offset of RI is '0', RI has the same offset as that of CQI. The offset of RI is defined by 0 and a value of a negative number. In more detail, in FIG. 11(b), it is assumed that the transmission period of RI is one time of the transmission period of WB CQI and the offset of RI is '−1' in the same environment as that of FIG. 11(a). Since the transmission period of RI is one time of the transmission period of WB CQI, the transmission period of the channel state information is substantially the same. Since the offset of RI is '−1', RI is transmitted on the basis of '−1' (that is, $0^{th}$ subframe) for offset '1' of CQI in FIG. 11(a). If the offset of RI is '0', transmission subframes of WB CQI and RI are overlapped with each other. In this case, WB CQI is dropped and RI is transmitted.

Figure 12:
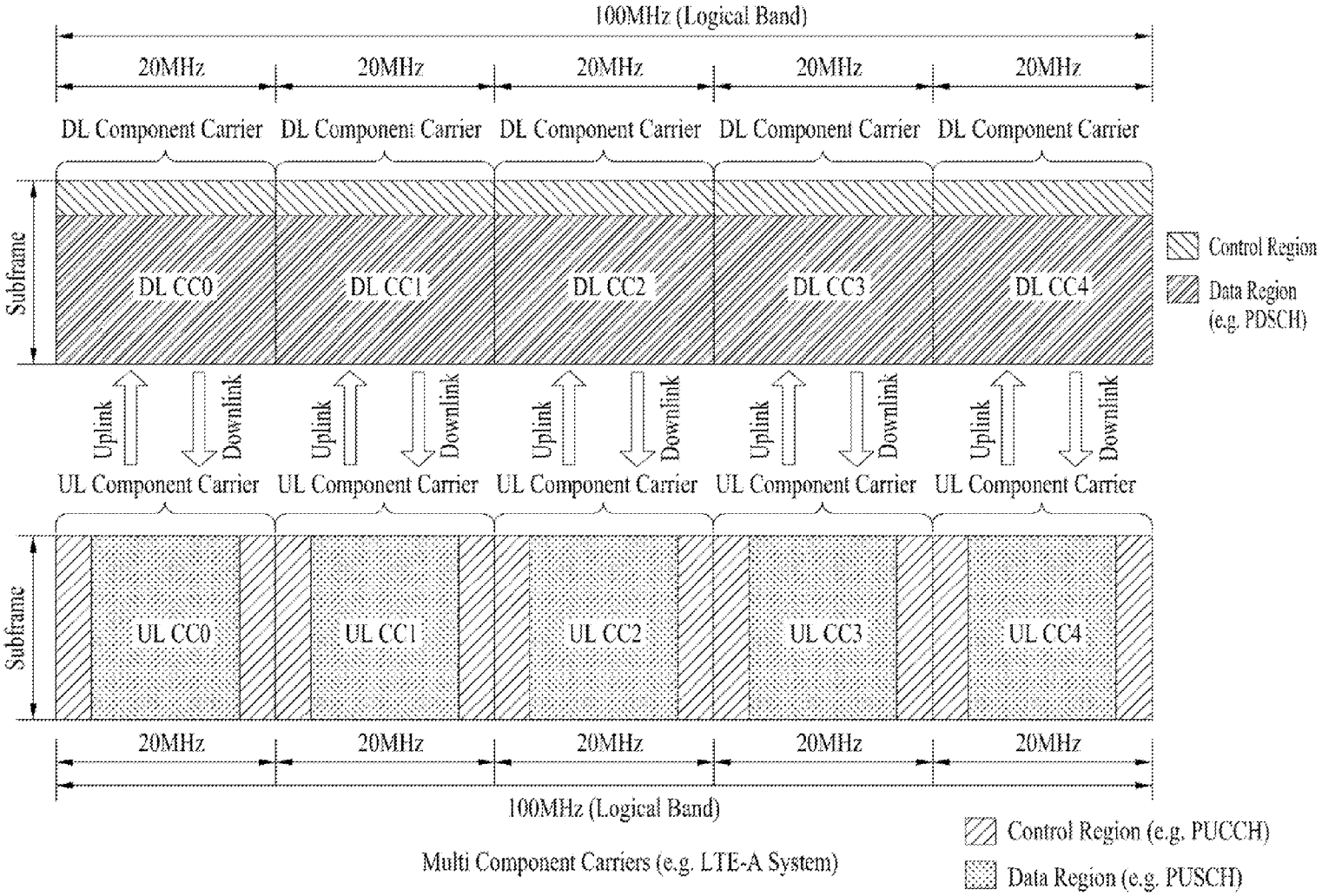
FIG. 12 is a diagram illustrating a carrier aggregation (CA) communication system.

FIG. 12 is a diagram illustrating a carrier aggregation (CA) communication system. The LTE-A system uses the carrier aggregation technology or the bandwidth aggregation technology, which uses greater uplink/downlink bandwidth through a plurality of uplink/downlink frequency blocks, to use wider frequency bandwidth. Each frequency block is transmitted using a component carrier (CC). The component carrier may be understood as carrier frequency (or center carrier or center frequency) for a corresponding frequency block.

Referring to FIG. 12, a plurality of uplink/downlink component carriers (CC) may be collected to support wider uplink/downlink bandwidth. The respective CCs may adjoin each other or not in the frequency domain. A bandwidth of each component carrier may be defined independently. Asymmetric carrier aggregation where the number of UL CCs is different from the number of DL CCs may be performed. For example, if the number of DL CCs is 2 and the number of UL CCs is 1, carrier aggregation may be configured to correspond to 2:1. DL CC/UL CC links may be fixed to the system or may be configured semi-statically. Also, even though a system full band includes N number of CCs, a frequency band that may be monitored and received by a specific user equipment may be limited to M(<N) number of CCs. Meanwhile, the control information may be set to be transmitted and received through a specific CC only. This specific CC may be referred to as a primary CC (PCC) (or anchor CC), and the other CCs may be referred to as secondary CCs (SCC).

The LTE-A system uses a concept of cell to manage radio resources. The cell is defined by combination of downlink resources and uplink resources, wherein the uplink resources may be defined selectively. Accordingly, the cell may be configured by downlink resources only, or may be configured by downlink resources and uplink resources. If carrier aggregation is supported, linkage between carrier frequency (or DL CC) of the downlink resources and carrier frequency (or UL CC) of the uplink resources may be indicated by system information. The cell operated on the primary frequency (or PCC) may be referred to as a primary cell (PCell), and the cell operated on the secondary frequency (or SCC) may be referred to as a primary cell (PCell). The PCell is used such that the user equipment performs an initial connection establishment procedure or connection re-establishment procedure. The PCell may refer to a cell indicated during a handover procedure. The Scell may be configured after RRC connection is established, and may be used to provide an additional radio resource. The Pcell and the Scell may be referred to as serving cells. Accordingly, although the user equipment is in RRC-CONNECTED state, if it is not set by carrier aggregation or does not support carrier aggregation, a single serving cell configured by the P cell only exists. On the other hand, if the user equipment is in the RRC-CONNECTED state and is set by carrier aggregation, one or more serving cells may exist, wherein the serving cells may include the Pcell and full Scells. After an initial security activity procedure starts, for the user equipment supporting carrier aggregation, the network may configure one or more Scells in addition to the Pcell initially configured during a connection establishment procedure.

If cross-carrier scheduling (or cross-CC scheduling) is used, the PDCCH for downlink allocation is transmitted to DL CC#0, and the corresponding PDSCH may be transmitted to DL CC#2. For cross-carrier scheduling, the introduction of a carrier indicator field (CIF) may be considered. The presence of CIF within the PDCCH may be configured by higher layer signaling (for example, RRC signaling) semi-statically and user equipment-specifically. The base lines of PDCCH transmission will be summed up as follows.

CIF disabled: the PDCCH on the DL CC allocates PDSCH resource on the same DL CC or PUSCH resource on one linked UL CC.

CIF enabled: the PDCCH on the DL CC may allocate PDSCH or PUSCH resource on a specific DL/UL CC among a plurality of aggregated DL/UL CCs by using the CIF.

If the CIF exists, the base station may allocate a PDCCH monitoring DL cell set to reduce complexity of blind decoding (BD) in view of the user equipment. The PDCCH monitoring DL cell set includes one or more DL CCs as a part of the aggregated DL CCs, and the user equipment detects and decodes the PDCCH on the corresponding DL CC only. In other words, if the base station schedules the PDSCH/PUSCH to the user equipment, the PDCCH is transmitted through the PDCCH monitoring DL CC set only. The PDCCH monitoring DL CC set may be configured user equipment-specifically, user equipment group-specifically or cell-specifically. The terms "PDCCH monitoring DL CC" may be replaced with the equivalent terms such as monitoring carrier and monitoring cell. Also, the CCs aggregated for the user equipment may be replaced with the equivalent terms such as serving CCs, serving carriers, and serving cells.

Figure 13:
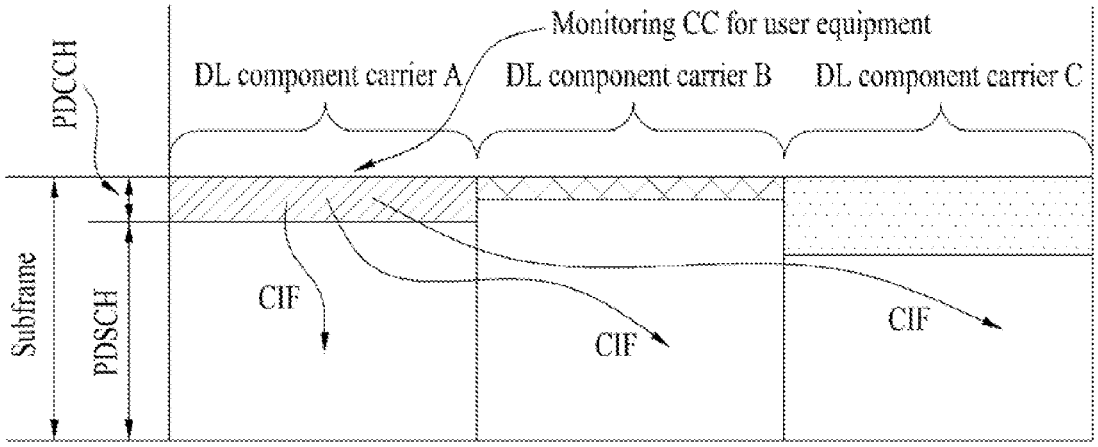
FIG. 13 is a diagram illustrating cross-carrier scheduling.

FIG. 13 is a diagram illustrating scheduling when a plurality of carriers are aggregated. It is assumed that three DL cells are aggregated. It is also assumed that DL CC A is set to a PDCCH monitoring DL CC. DL CC A to DL CC C may be referred to as serving CCs, serving carriers, serving cells, etc. If the CIF is disabled, each DL CC may transmit the PDCCH only that schedules PDSCH of the DL CC without CIF in accordance with the LTE PDCCH rule. On the other hand, if the CIF is enabled, the DL CC A (monitoring DL CC) may transmit the PDCCH, which schedules the PDSCH of another CC, as well as the PDCCH, which schedules the PDSCH of the DL CCA. In this case, the PDCCH is not transmitted from the DL CC B/C which is not set to the PDCCH monitoring DL CC.

In the LTE-A system, a new type enhanced PUCCH format (E-PUCCH format) (that is, PUCCH format 3) has been introduced for transmission of more ACK/NACK signals.

Figure 14:
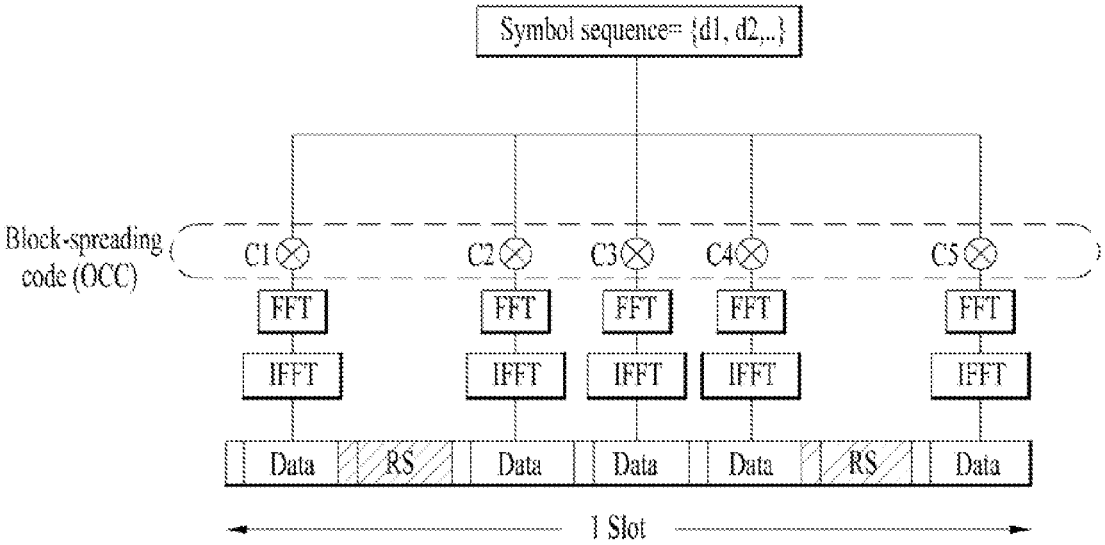
FIGS. 14 and 15 are diagrams illustrating an enhanced-PUCCH (E-PUCCH) format (that is, PUCCH format 3)

FIG. 14 is a diagram illustrating E-PUCCH format (that is, PUCCH format 3) of a slot level. A plurality of kinds of ACK/NACK information is transmitted through joint coding (for example, Reed-Muller code, Tail-biting convolutional code, etc.), block-spreading and SC-FDMA modulation.

Referring to FIG. 14, one symbol sequence is transmitted over the frequency domain, and orthogonal cover code (OCC) based time-domain spreading is applied to the corresponding symbol sequence. Control signals of several user equipments may be multiplexed into the same RB by using the OCC. In more detail, five SC-FDMA symbols (that is, UCI data part) are generated from one symbol sequence {d1, d2, . . . } by using OCCs C1 to C5 of a length-5 (SF (spreading factor)=5). In this case, the symbol sequence {d1, d2, . . . } may mean a modulation symbol sequence or codeword bit sequence. If the symbol sequence {d1, d2, . . . } means a codeword bit sequence, the block diagram of FIG. 9 further includes a modulation block. Although a total of two RS symbols (that is, RS part) are used for one slot in the drawing, various applications may be considered in such a manner that RS part of three RS symbols is used and UCI data part based on OCC of SF=4 is used. In this case, the RS symbols may be generated from constant amplitude zero autocorrelation (CAZAC) sequences having a specific cyclic shift. Also, the RS may be transmitted in a format in which a specific OCC is applied to (multiplied by) a plurality of RS symbols of the time domain.

Figure 15:
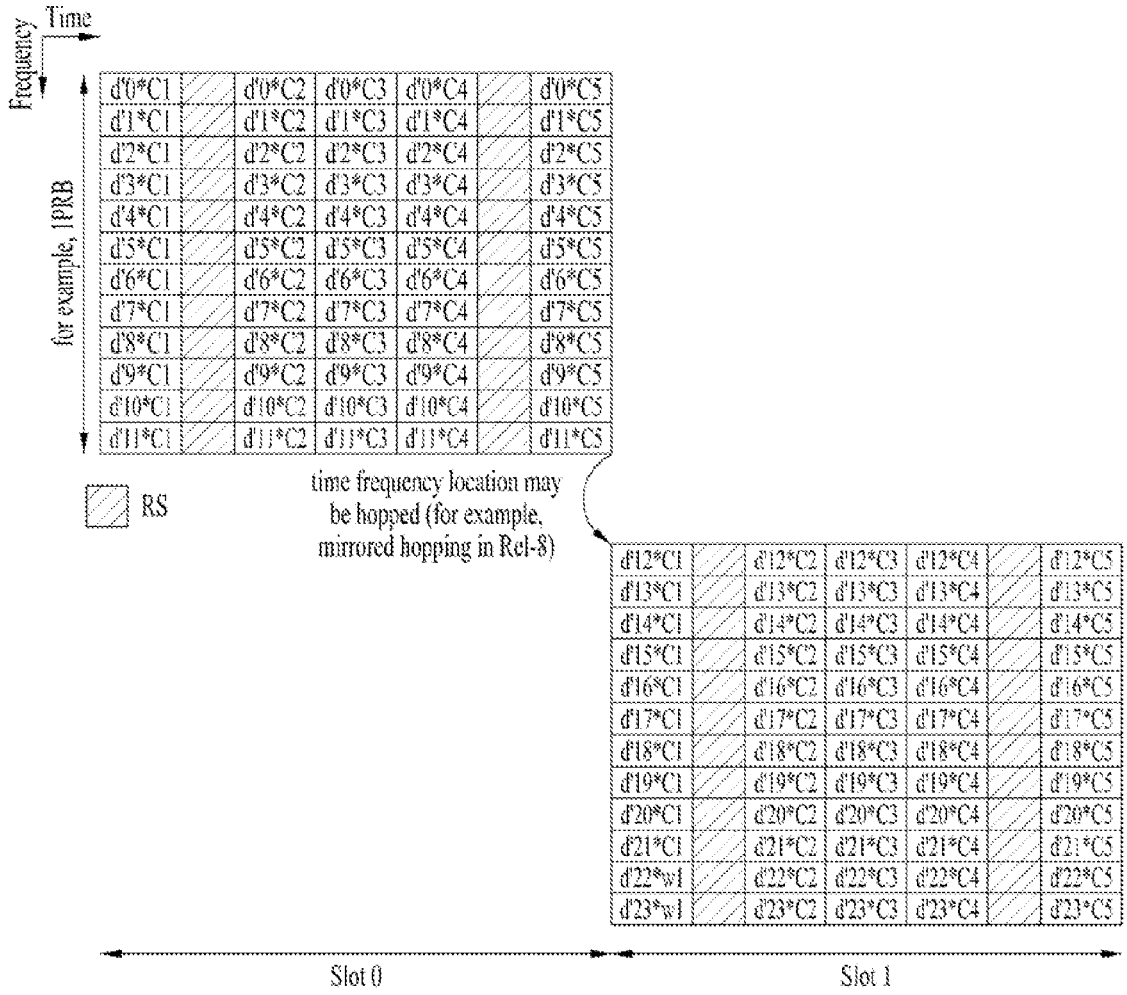

FIG. 15 illustrates E-PUCCH format (that is, PUCCH format 3) at a subframe level.

Referring to FIG. 15, symbol sequences {d'0 to d'11} in a slot 0 are mapped into subcarrier of one SC-FDMA symbol and mapped into five SC-FDMA symbols by block-spreading based on OCCs C1 to C5. Similarly, symbol sequences {d'12 to d'23} in a slot 1 are mapped into subcarrier of one SC-FDMA symbol and mapped into five SC-FDMA symbols by block-spreading based on OCCs C1 to C5. In this case, the symbol sequences {d'0 to d'11} or the symbol sequences {d'12 to d'23} shown in each slot represent the format in which FFT or FFT/IFFT is applied to the symbol sequences {d1, d2, . . . } of FIG. 10. If the symbol sequences {d'0 to d'11} or {d'12 to d'23} corresponds to the format in which FFT is applied to the symbol sequences {d1, d2, . . . } of FIG. 9, IFFT is additionally applied to the symbol sequences {d'0 to d'11} or {d'12 to d'23} to generate SC-FDMA symbols. The total symbol sequences {d'0 to d'23} are generated by joint coding of one or more UCI, and the first half {d'0 to d'11} is transmitted through the slot 0, and the other half {d'12 to d'23} is transmitted through the slot 1. Although not shown, the OCC may be varied in a unit of slot, and UCI data may be scrambled in a unit of SC-FDMA symbol.

Figure 16:
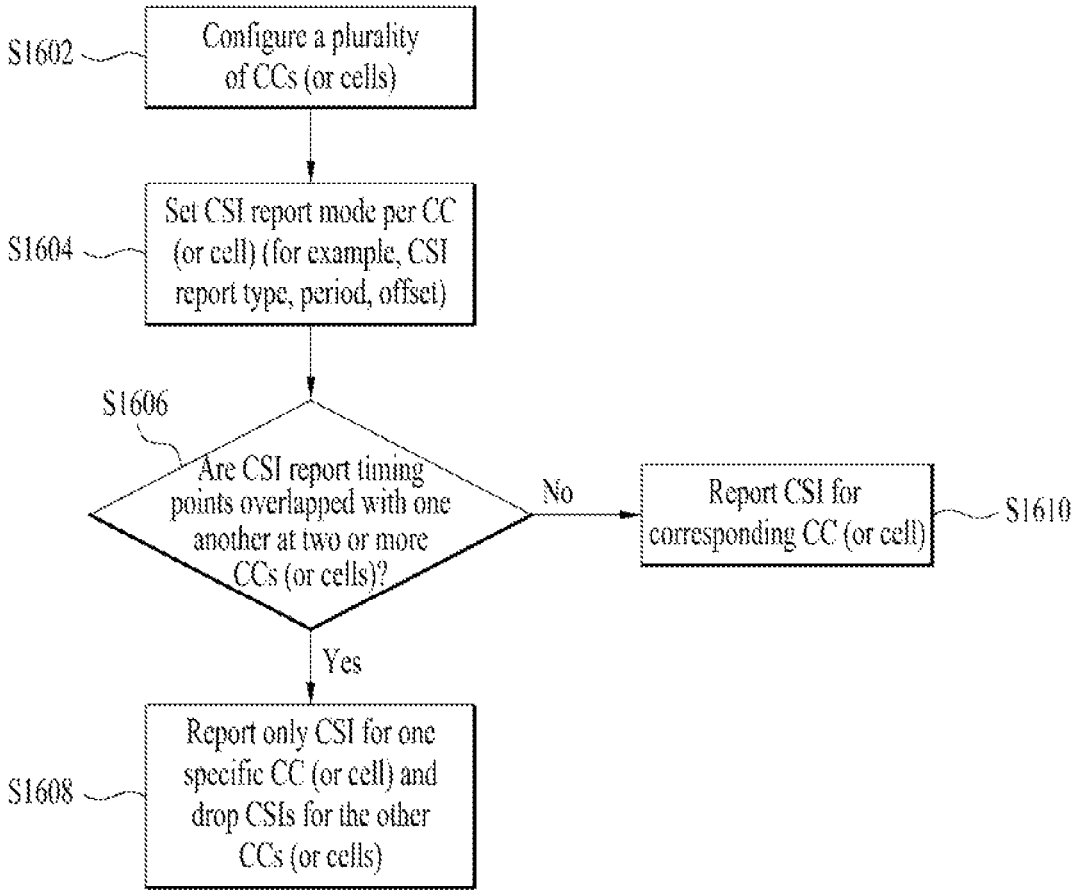
FIG. 16 is a diagram illustrating a procedure of CSI report according to the related art when a plurality of carriers or cells are aggregated.

FIG. 16 is a diagram illustrating a procedure of CSI report according to the related art when a plurality of carriers or cells are aggregated.

Referring to FIG. 16, the LTE-A supports aggregation of a plurality of CCs (or cells) (see FIG. 13) (S1602), and a periodic CSI report mode may be set independently per CC (for example, in accordance with transmission mode) (S1604). Under the circumstances, if CSI report subframes are overlapped with one another in the plurality of CCs (S1606), (regardless of transmission based on PUCCH formats 2/2a/2b or transmission based on piggyback to the PUSCH) CSI for a specific one of the plurality of CCs is only transmitted through the corresponding subframe, and CSI for the other CCs is dropped (S1608). One CSI (or one CC which will be a target for CSI transmission) which will be a target for transmission may be determined through Step 1 or Step 2 as follows.

Step 1) If only one CSI (CC) has the highest CSI type priority, corresponding CSI (for CC) is only transmitted.

Step 2) If a plurality of CSI (CC) have the highest CSI type priority, CSI for CC having the lowest ServCellIndex of the plurality of CCs is only transmitted.

In this case, the CSI type is given as follows, and the priority may be given in the order of CSI type 3, 5, 6, 2a (that is, $1^{st}$ CSI type)>CSI type 2, 2b, 2c, 4 (that is, $2^{nd}$ CSI type)>CSI type 1, 1a (that is, $3^{rd}$ CSI type).

Type 1 report supports CQI feedback for the UE selected sub-bands

Type 1a report supports subband CQI and second PMI feedback

Type 2, Type 2b, and Type 2c report supports wideband CQI and PMI feedback

Type 2a report supports wideband PMI feedback

Type 3 report supports RI feedback

Type 4 report supports wideband CQI

Type 5 report supports RI and wideband PMI feedback

Type 6 report supports RI and PTI feedback

In the meantime, CSI transmission timing points are not overlapped with each other at two or more CCs (that is, if CSI transmission for one CC is required for the corresponding subframe), CSI for the corresponding CC is transmitted through the corresponding subframe (S1610).

If periodic CSI report for the plurality of CCs is performed through the aforementioned related art method, resources (that is, overhead) required for CSI transmission may be reduced. However, a problem may occur in accuracy and efficiency of channel estimation and scheduling due to dropped CSIs in a state that CSI report subframes for the plurality of CCs are overlapped with one another. In this respect, there may be considered a method for simultaneously transmitting a plurality of CSIs for a plurality of CCs by using UL channel/format, which may support payload relatively greater than that of the existing PUCCH formats 2/2a/2b. For convenience, UL channel/format for transmission of a plurality of CSIs will be referred to as UL channel/format X. The UL channel/format may be, but not limited to, PUSCH or PUCCH format 3, or new UL channel/format which is similar to the PUSCH or PUCCH format 3. Hereinafter, unless mentioned specifically, the UL channel/format X may be used to refer to the PUSCH or PUCCH format 3. Resources for the UL channel/format X may previously be allocated to the user equipment through higher layer signaling (for example, RRC signaling). Meanwhile, if CSI transmission is performed using the UL channel/format X (for example, PUSCH or PUCCH format 3 for transmission of a plurality of CSIs) without considering the number/amount of CSIs to be transmitted and CSI type, efficiency in use of UL resources may be reduced.

Accordingly, the present invention suggests a method for simultaneously transmitting a plurality of CSIs for a plurality of CCs on the basis of PUSCH or PUCCH format 3 (simply referred to as PUSCH or PUCCHF3) by considering the number/amount of CSIs of which transmission is required through CSI report subframe, CSI type, UL data, and ACK/NACK. For convenience, it is assumed that the priority based on the CSI type which is used is given by the order of CSI type 3, 5, 6, 2a (that is, $1^{st}$ CSI type)>CSI type 2, 2b, 2c, 4 (that is, $2^{nd}$ CSI type)>CSI type 1, 1a (that is, $3^{rd}$ CSI type), as described with reference to FIG. 16. However, this priority is exemplary, and the CSI type applied to the present invention and the CSI priority based on the CSI type may be varied depending on the communication environment. The CSI type applied to the present invention and the CSI priority based on the CSI type may include, but not limited to, a CSI type of a specific use such as cooperative multi-point (CoMP) CSI feedback and a CSI priority corresponding to the CoMP CSI feedback.

Method 1: Limitation of the Number of CSIs (the Number of CCs for CSI Transmission) which are Simultaneously Transmitted For example, the number of minimum CSIs (CCs), which may be transmitted using PUSCH or PUCCHF3, may be limited to M. In this case, if the number of CSIs (CCs) of which transmission is required through CSI report subframe is $N_{CSI}$, the following operation may be defined. For example, M may be, but not limited to, 2 (M=2).

i) In case of $N_{CSI} \geq M$ (CSI initially transmitted under the corresponding condition will be referred to as "CSI 1-1")

simultaneous transmission of the corresponding $N_{CSI}$ CSIs (for CCs) by using PUSCH or PUCCHF3.

ii) In case of $N_{CSI} < M$ (CSI initially transmitted under the corresponding condition will be referred to as "CSI 1-2")

one CSI (for CC) determined on the basis of Step 1 or 2 is only transmitted using PUCCH formats 2/2a/2b, or all the CSIs are dropped (in this case, separate PUCCH format 2/2a/2b allocation may not be required).

For another example, the number of maximum CSIs (CCs), which may be transmitted using PUSCH or PUCCHF3, may be limited to L. In this case, the following operation may be defined in accordance with $N_{CSI}$.

i) In case of $N_{CSI} \leq L$ simultaneous transmission of the corresponding $N_{CSI}$ CSIs (for CCs) by using PUSCH or PUCCHF3.

ii) In case of $N_{CSI} > L$ transmission of L number of CSIs (for CCs) having the highest priority using PUSCH or PUCCHF3 on the basis of Step 1 or 2

For another example, the number of minimum and maximum CSIs, which may be transmitted using PUSCH or PUCCHF3 by combination of the above two methods, may be limited to M and L, respectively. In this case, the following operation may be defined.

i) In case of $N_{CSI} > L$ transmission of L number of CSIs (for CCs) having the highest priority using PUSCH or PUCCHF3 on the basis of Step 1 or 2 ii) In case of $L \geq N_{CSI} \geq M$ simultaneous transmission of the corresponding $N_{CSI}$ CSIs (for CCs) by using PUSCH or PUCCHF3 iii) $N_{CSI} < M$ one CSI (for CC) determined on the basis of Step 1 or 2 is only transmitted using PUCCH formats 2/2a/2b, or all the CSIs are dropped (in this case, separate PUCCH format 2/2a/2b allocation may not be required).

In this case, the parameters M and L may be set UE-commonly or UE-specifically through broadcast or layer 1 (L1)/layer 2 (L2)/radio resource control (RRC) signaling.

The aforementioned description illustrates that CSI transmission is performed using two types of physical channels. Similarly, the CSI transmission channels may be determined in the order of PUCCH formats 2/2a/2b=>PUCCH format 3=>PUSCH in accordance with the number of CSI CCs.

Method 2: Limitation of the Number All CSI Bits which are Simultaneously Transmitted For example, the number of minimum CSI bits, which may be transmitted using PUSCH or PUCCHF3, may be limited to K. In this case, if the number of all the CSI bits of which transmission is required through the CSI report subframe is $O_{CSI}$, the following operation may be defined. For example, K may be, but not limited to, 12 (K=12).

i) In case of $O_{CSI} \geq K$ (CSI initially transmitted under the corresponding condition will be referred to as "CSI 2-1")

simultaneous transmission of the corresponding $O_{CSI}$ CSI bits by using PUSCH or PUCCHF3.

ii) In case of $O_{CSI} < K$ (CSI initially transmitted under the corresponding condition will be referred to as "CSI 2-2")

X number of CSIs (for CC) having the highest priority on the basis of Step 1 or 2 and a total of CSI bits of maximum integer less than 11 are only transmitted using PUCCH formats 2/2a/2b, or all the CSIs are dropped (in this case, separate PUCCH format 2/2a/2b allocation may not be required).

For another example, the number of maximum CSIs (CCs), which may be transmitted using PUSCH or PUCCHF3, may be limited to H. In this case, the following operation may be defined in accordance with $O_{CSI}$.

i) In case of $O_{CSI} \leq H$ simultaneous transmission of the corresponding $O_{CSI}$ CSIs (for CCs) by using PUSCH or PUCCHF3.

ii) In case of $O_{CSI} > H$ transmission of Y number of CSIs (for CCs) having the highest priority on the basis of Step 1 or 2 and a total of CSI bits of maximum integer less than H by using PUSCH or PUCCHF3

For another example, the number of minimum and maximum CSIs, which may be transmitted using PUSCH or PUCCHF3 by combination of the above two methods, may be limited to K and H, respectively. In this case, the following operation may be defined.

i) In case of $O_{CSI} > L$ transmission of Y number of CSIs (for CCs) having the highest priority on the basis of Step 1 or 2 and a total of CSI bits of maximum integer less than H by using PUSCH or PUCCHF3 ii) In case of $H \geq O_{CSI} \geq K$ simultaneous transmission of the corresponding $O_{CSI}$ CSI bits by using PUSCH or PUCCHF3 iii) $O_{CSI} < K$

X number of CSIs (for CC) having the highest priority on the basis of Step 1 or 2 and a total of CSI bits of maximum integer less than 11 are only transmitted using PUCCH formats 2/2a/2b, or all the CSIs are dropped (in this case, separate PUCCH format 2/2a/2b allocation may not be required).

In this case, the parameters K and H may be set UE-commonly or UE-specifically through broadcast or L1/L2/RRC signaling.

The aforementioned description illustrates that CSI transmission is performed using two types of physical channels. Similarly, the CSI transmission channels may be determined in the order of PUCCH formats 2/2a/2b=>PUCCH format 3=>PUSCH in accordance with the number of CSI bits.

Method 3: Feedback of a Plurality of CSIs (CCs) Having the Highest CSI Type Priority in Step 2

In Step 2, one CSI (CC), which will be a target for final transmission, among a plurality of CSIs (CCs) having the highest CSI type priority, is simply determined on the basis of the lowest cell index (lowest ServCellIndex) only. Accordingly, it is likely that CSI loss may be increased for CC having relatively high ServCellIndex in spite of the high CSI type priority. In this respect, in the same manner as the condition of Step 2, this method suggests that a plurality of CSIs (for a plurality of CCs) are transmitted using PUSCH or PUCCHF3 at the same time if the plurality of CSIs (CCs) have the highest CSI type priority for the CSI report subframe. If only one CSI (CC) has the highest CSI type priority for the CSI report subframe, the corresponding CSI (for CC) may only be transmitted using PUCCH formats 2/2a/2b.

Also, this method may be applied to a specific CSI type priority only. For example, if a plurality of CSIs (CCs) correspond to the first CSI types for the CSI report subframe, the corresponding CSIs (for CCs) are transmitted using PUSCH or PUCCHF3 at the same time. If not so, only one CSI (for CC) determined on the basis of Step 1/2 may be transmitted using the PUCCH formats 2/2a/2b. For another example, if a plurality of CSIs (CCs) correspond to the first CSI type for the CSI report subframe or if a plurality of CSIs (CCs) correspond to the second CSI type and have the highest priority, the corresponding CSIs (for CCs) may be transmitted using the PUSCH or PUCCHF3 at the same time. If not so, only one CSI (for CC) determined on the basis of Step 1/2 may be transmitted using the PUCCH formats 2/2a/2b.

Method 4: Configuration of UL Channel/Format for CSI Report per CC

This method suggests that UL channel/format used for CSI report for each CC is configured independently per CC. In more detail, whether CSI for corresponding CC will be transmitted using PUSCH or PUCCHF3 or PUCCH formats 2/2a/2b may be configured independently for each CC through RRC signaling. Through this configuration, CC group, which will be a target for CSI transmission based on PUSCH or PUCCHF3, will be referred to as "CSI group #1". Similarly, CC group, which will be a target for CSI transmission based on the PUCCH formats 2/2a/2b, will be referred to as "CSI group #2". In more detail, the base station may configure a proper CSI report channel/format per CC (group) by considering similarity of CSI feedback modes between CCs aggregated by the user equipment, similarity of CSI transmission period timing (for example, period, offset), priority for CSI protection between CCs. As the proper CSI report channel/format is configured per CC (group), channel information lack and scheduling restrictions, which are caused by frequent or unnecessary (or critical) CSI drop, may be reduced. Also, in view of efficiency in use of resources, wasteful use (for example, large sized PUSCH or PUCCHF3 is used unnecessarily even in case that CSI transmission for one CC is required) of PUSCH or PUCCHF3, which requires relatively much resource consumption, may be reduced.

Under the circumstances, if CSI transmission for one or more CCs belonging to CSI group #1 is required for a specific subframe, CSI for all the corresponding CCs may be transmitted through the PUSCH or PUCCHF3. Also, if CSI transmission for one or more CCs belonging to CSI group #2 is required for a specific subframe, CSI for one CC, which is determined on the basis of Step 1/2 among the corresponding CCs, may only be transmitted through the PUCCH formats 2/2a/2b. Meanwhile, if CSI transmission for one or more CCs belonging to CSI group #1 and CSI transmission for one or more CCs belonging to CSI group #2 are simultaneously required for a specific subframe, the following operations may be considered as the case may be.

Alt 1) CSI for all of the corresponding CC(s) belonging to CSI group #1 and the corresponding CC(s) belonging to CSI group #2 is transmitted using PUSCH or PUCCHF3.

Alt 2) CSI for all of the corresponding CC(s) belonging to CSI group #1 and CSI for one CC determined by Step 1/2 based on the corresponding CC(s) belonging to CSI group #2 are transmitted using PUSCH or PUCCHF3.

Alt 3) CSI for the CSI group #2 is dropped, and CSI for the CSI group #1 is transmitted using PUSCH or PUCCHF3.

Alt 4) CSI for the CSI group #1 is dropped, and CSI for one CC determined on the basis of Step 1/2 for the CSI group #2 is only transmitted using the PUCCH formats 2/2a/2b.

Alt 4) CSI for one CC determined on the basis of Step 1/2 for all of the CSI group #1 and the CSI group #2 is only transmitted using the PUCCH formats 2/2a/2b.

Alt 1 may reduce possible CSI drop and thus may be useful in view of the aspect that channel information lack and scheduling restrictions may be reduced. Alt 2 or 3 reduces CSI drop and at the same time reduces a sudden increase of a code rate of PUSCH or PUCCHF3, whereby Alt 2 or 3 may be useful in view of CSI transmission performance. Alt 4 or 5 may maintain CSI protection priority and at the same time reduce use frequency of PUSCH or PUCCHF3 if possible, whereby Alt 4 or 5 may be useful in view of efficiency in use of resources. Meanwhile, a plurality of Alt methods may be defined, and whether any one of these methods will be applied may be configured through RRC signaling.

Method 5: Simultaneous Transmission Method According to the Presence of UL Data

It is considered that PUSCH is used for transmission of a plurality of CSIs. In this case, the PUSCH means a channel which is previously allocated for transmission of a plurality of CSIs, and is identified from PUSCH allocated by the existing UL grant PDCCH. For convenience, the PUSCH allocated for transmission of a plurality of CSIs will be referred to as PUSCH_CSI, and the PUSCH allocated by the UL grant PDCCH will be referred to as PUSCH_UG. If there is no PUSCH_UG transmission for the CSI report subframe except for PUSCH_CSI and UL data to be transmitted exist, the following operation may be considered to reduce delay of UL data transmission.

i) In case of CSI 1-1 or CSI 2-1 (that is, if the number/amount of CSIs is more than the number/amount of minimum CSIs for simultaneous transmission), the corresponding CSI is only transmitted through PUSCH_CSI regardless of the presence of UL data (if UL data exist, transmission of the corresponding UL data is delayed).

ii) In case of CSI 1-2 or CSI 2-2 (that is, if the number/amount of CSIs is smaller than the number/amount of minimum CSIs for simultaneous transmission), and if UL data do not exist, the corresponding CSI is only transmitted through PUCCH formats 2/2a/2b, or all of the CSIs are dropped (in this case, separate PUCCH format 2/2a/2b allocation may not be required).

iii) In case of CSI 1-2 or CSI 2-2, and if UL data exist, the corresponding CSI and UL data are transmitted through PUSCH_CSI at the same time.

Method 6: Simultaneous Transmission Method According to the Presence of ACK/NACK It is considered that PUSCH is used for transmission of a plurality of CSIs. In this case, the PUSCH means a channel which is previously allocated for transmission of a plurality of CSIs, and is identified from PUSCH allocated by the existing UL grant PDCCH. For convenience, the PUSCH allocated for transmission of a plurality of CSIs will be referred to as PUSCH_CSI, and the PUSCH allocated by the UL grant PDCCH will be referred to as PUSCH_UG. According to the related art, if the CSI transmission timing is the same as the ACK/NACK transmission timing and there is no PUSCH allocated for the corresponding subframe, CSI is dropped in accordance with UCI priority. In this method, if there is no PUSCH_UG transmission for the CSI report subframe except for PUSCH_CSI and ACK/NACK for DL data exists, the following operation may be considered to reduce loss caused by CSI drop.

i) In case of CSI 1-1 or CSI 2-1 (that is, if the number/amount of CSIs is more than the number/amount of minimum CSIs for simultaneous transmission), and if ACK/NACK does not exist, the corresponding CSI is only transmitted through PUSCH_CSI.

ii) In case of CSI 1-1 or CSI 2-1, and if ACK/NACK exists (that is, if the number/amount of CSIs is more than the number/amount of minimum CSIs for simultaneous transmission and ACK/NACK exists), the corresponding CSI and ACK/NACK are transmitted through PUSCH_CSI at the same time.

iii) In case of CSI 1-2 or CSI 2-2 (that is, if the number/amount of CSIs is smaller than the number/amount of minimum CSIs for simultaneous transmission), and if ACK/NACK does not exist, the corresponding CSI is only transmitted through PUCCH formats 2/2a/2b, or all of the CSIs are dropped (in this case, separate PUCCH format 2/2a/2b allocation may not be required).

iv) In case of CSI 1-2 or CSI 2-2, and if ACK/NACK exists, the corresponding CSI and ACK/NACK are transmitted through PUSCH_CSI at the same time (at this time, if ACK/NACK for DL data transmitted through PCC exists only, the CSI and the ACK/NACK may be transmitted using the PUCCH formats 2/2a/2b, or CSI may be dropped and ACK/NACK may only be transmitted using the PUCCH formats 1a/1b (in this case, separate PUCCH format 2/2a/2b allocation may not be required).

Method 7: Simultaneous Transmission Method According to SR Report Subframe

It is considered that PUSCH is used for transmission of a plurality of CSIs. In this case, the PUSCH means a channel which is previously allocated for transmission of a plurality of CSIs, and is identified from PUSCH allocated by the existing UL grant PDCCH. For convenience, the PUSCH allocated for transmission of a plurality of CSIs will be referred to as PUSCH_CSI, and the PUSCH allocated by the UL grant PDCCH will be referred to as PUSCH_UG. According to the related art, if the CSI report subframe is overlapped with the SR report subframe, CSI is dropped in accordance with UCI priority. In this method, if the CSI report subframe is overlapped with the SR subframe and there is no PUSCH_UG transmission for the corresponding time except for PUSCH_CSI, the following operation may be considered to reduce loss caused by CSI drop.

i) In case of CSI 1-1 or CSI 2-1 (that is, if the number/amount of CSIs is more than the number/amount of minimum CSIs for simultaneous transmission), the corresponding CSI and 1-bit SR (negative/positive SR) are transmitted through PUSCH_CSI at the same time.

ii) In case of CSI 1-2 or CSI 2-2 (that is, if the number/amount of CSIs is smaller than the number/amount of minimum CSIs for simultaneous transmission), the corresponding CSI and 1-bit SR are transmitted through PUCCH formats 2/2a/2b at the same time, or CSI is dropped and 1-bit SR is only transmitted using PUCCH format 1 (in this case, separate PUCCH format 2/2a/2b allocation may not be required).

Figure 17:
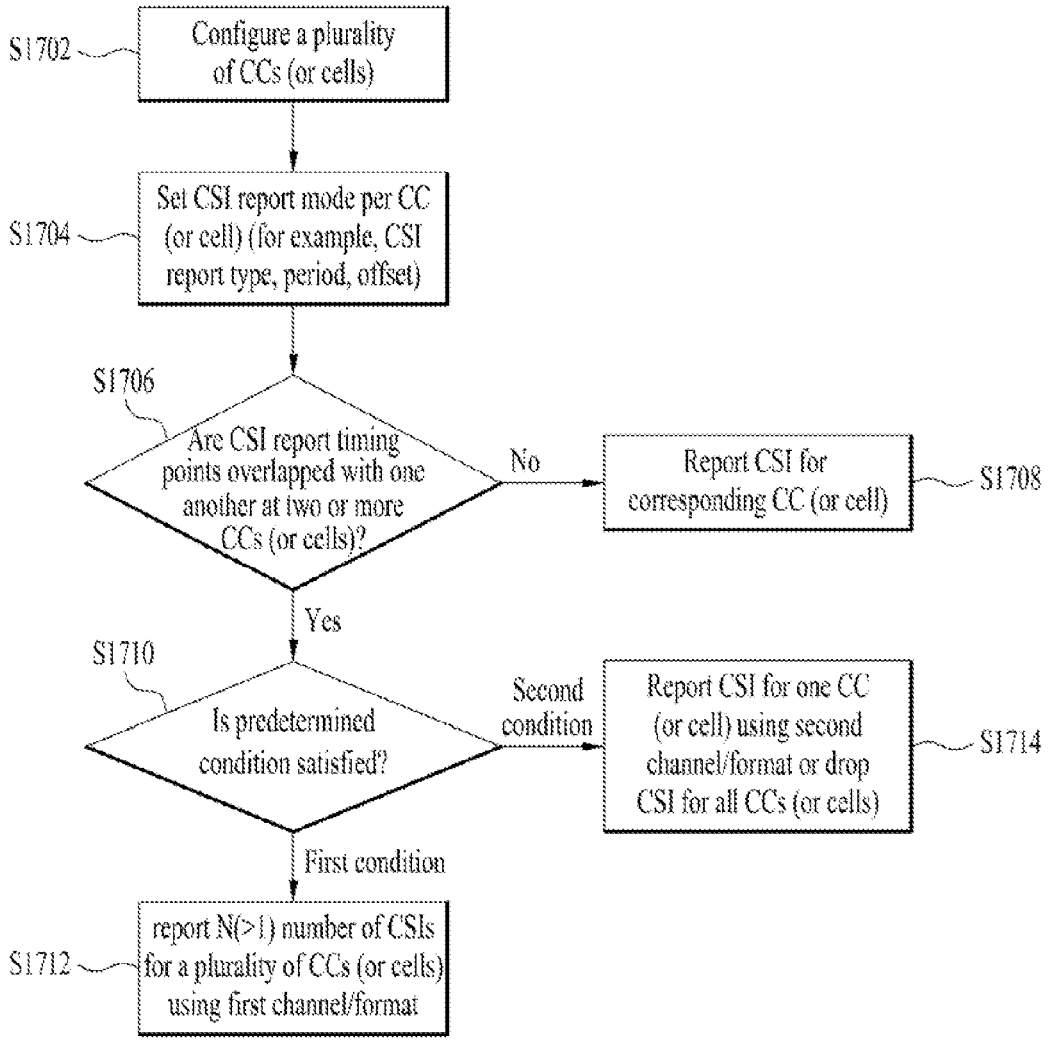
FIG. 17 is a diagram illustrating a procedure of CSI report according to the embodiment of the present invention when a plurality of carriers or cells are aggregated.

FIG. 17 is a diagram illustrating a procedure of CSI report according to the embodiment of the present invention when a plurality of carriers or cells are aggregated.

Referring to FIG. 17, a plurality of CCs (or cells) are configured for a user equipment (S1702), and a periodic CSI report mode is configured independently for each CC (for example, in accordance with transmission mode) (S1704). If CSI report subframes are not overlapped with one another at the plurality of CCs (that is, if CSI transmission for one CC is only required for the corresponding subframe) (S1706), the CSI for the corresponding CC is transmitted through the corresponding subframe (S1708). On the other hand, if the CSI report subframes are overlapped with one another at the plurality of CCs (S1706), the user equipment may determine whether the CSI report status satisfies a predetermined condition (S1708). In this case, if the first condition is satisfied, the user equipment may report N (>1) number of CSIs for the plurality of CCs (or cells) by using the first channel/format (S1712), and if the second condition is satisfied, the user equipment may report CSI for one CC (or cell) by using the second channel/format or drop CSI for all of the CCs (or cells) (S1714). In this case, the first condition and the second condition are exemplary, and three or more conditions may be used. Also, the first channel/format may correspond to channel/format X, and the second channel/format may include the PUCCH formats 2/2a/2b.

For convenience, the description of the steps S1712 and S1714 corresponds to the first example of the method 1. This is exemplary, and each condition used in step S1710 and CSI report based on each condition may be varied depending on the description suggested in the methods 1 to 7.

Figure 18:
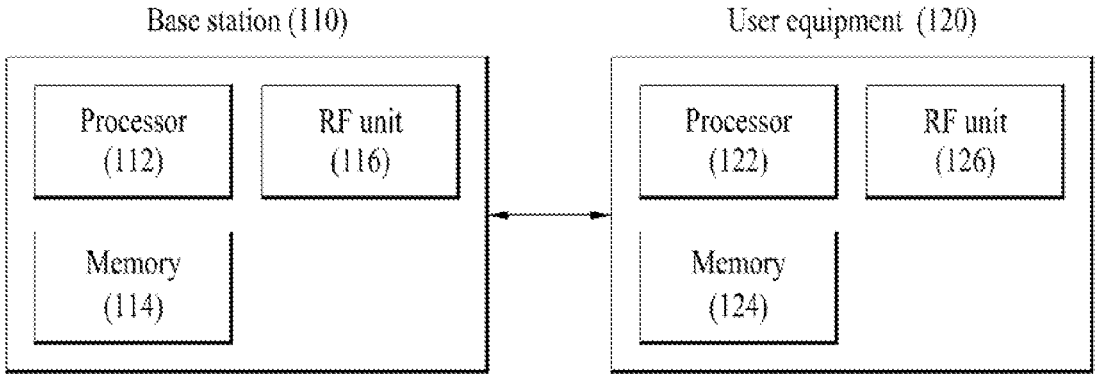
FIG. 18 is a diagram illustrating a base station and a user equipment, which can be applied to one embodiment of the present invention.

FIG. 18 is a diagram illustrating a base station and a user equipment, which can be applied to one embodiment of the present invention.

Referring to FIG. 18, the wireless communication system includes a base station (BS) 110 and a user equipment (UE) 120. The base station 110 includes a processor 112, a memory 114, and a radio frequency (RF) unit 116. The processor 112 may be configured to implement procedures and/or methods suggested in the present invention. The memory 114 is connected with the processor 112 and stores various kinds of information related to the operation of the processor 112. The RF unit 116 is connected with the processor 112 and transmits and/or receives a radio signal. The user equipment 120 includes a processor 122, a memory 124, and a radio frequency (RF) unit 126. The processor 122 may be configured to implement procedures and/or methods suggested in the present invention. The memory 124 is connected with the processor 122 and stores various kinds of information related to the operation of the processor 122. The RF unit 126 is connected with the processor 122 and transmits and/or receives a radio signal. The base station 110 and/or the user equipment 120 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Industrial Applicability

The present invention may be used for a wireless communication device such as a user equipment, a relay and a base station.

The invention claimed is:

[1. A method for reporting channel state information (CSI) in a wireless communication system that supports carrier aggregation, the method comprising:

configuring a plurality of downlink component carriers (DL CCs);

setting a CSI report mode corresponding to the plurality of DL CCs for each DL CC; and performing an operation for transmitting CSI in accordance with the CSI report mode set corresponding to each DL CC, wherein, if a P-number of CSIs overlap with one another for the same subframe and a first condition is satisfied, a Q-number of CSIs among the P-number of CSIs are transmitted through a first physical channel, and if the P-number of CSIs overlap with one another for the same subframe and a second condition is satisfied, only an R-number of CSIs among the P-number of CSI are transmitted through a second physical channel which is different from the first physical channel, R being smaller than Q.]

[2. The method according to claim 1, wherein the first condition includes that P is equal to or more than M, the second condition includes that P is less than M, P and Q are the same as each other, and M is a minimum number of CSIs allowed for simultaneous transmission through the first physical channel.]

[3. The method according to claim 1, wherein the first condition includes that P is more than L, the second condition includes that P is less than M, P is greater than Q, Q is the same as L, L is a maximum number of CSIs allowed for simultaneous transmission through the first physical channel, and M is a minimum number of CSIs allowed for simultaneous transmission through the first physical channel.]

[4. The method according to claim 1, wherein the first condition includes that a size sum of the P number of CSIs is equal to or more than M, the second condition includes that a size sum of the P number of CSIs is less than M, P is the same as Q, R is a number of CSIs, which has the highest priority among the P number of CSIs and a size sum of CSIs of maximum integer being equal to or less than S, M is a minimum size of CSI allowed for simultaneous transmission through the first physical channel, and S is an integer less than M determined in accordance with capacity of the second physical channel.]

[5. The method according to claim 1, wherein the first condition includes that a size sum of the P number of CSIs is more than L, the second condition includes that a size sum of the P number of CSIs is less than M, P is greater than Q, Q is a number of CSIs, which has the highest priority among the P number of CSIs and a size sum of CSIs of maximum integer being equal to or less than L, R is a number of CSIs, which has the highest priority among the P number of CSIs and a size sum of CSIs of maximum integer being equal to or less than S, L is a maximum size of CSI allowed for simultaneous transmission through the first physical channel, M is a minimum size of CSI allowed for simultaneous transmission through the first physical channel, and S is an integer less than M determined in accordance with capacity of the second physical channel.]

[6. A communication apparatus configured to report channel state information (CSI) in a wireless communication system that supports carrier aggregation, the communication apparatus comprising:

a radio frequency (RF) unit; and a processor, wherein the processor configures a plurality of downlink component carriers (DL CCs), sets a CSI report mode corresponding to the plurality of DL CCs for each DL CC; and performs an operation for transmitting CSI in accordance with the CSI report mode set corresponding to each DL CC, wherein, if a P-number of CSIs overlap with one another for the same subframe and a first condition is satisfied, a Q-number of CSIs among the P-number of CSIs are transmitted through a first physical channel, and if the P-number of CSIs overlap with one another for the same subframe and a second condition is satisfied, only an R-number of CSIs among the P-number of CSI are transmitted through a second physical channel which is different from the first physical channel, R being smaller than Q.]

[7. The communication apparatus according to claim 6, wherein the first condition includes that P is equal to or more than M, the second condition includes that P is less than M, P and Q are the same as each other, and M is a minimum number of CSIs allowed for simultaneous transmission through the first physical channel.]

[8. The communication apparatus according to claim 6, wherein the first condition includes that P is more than L, the second condition includes that P is less than M, P is greater than Q, Q is the same as L, L is a maximum number of CSIs allowed for simultaneous transmission through the first physical channel, and M is a minimum number of CSIs allowed for simultaneous transmission through the first physical channel.]

[9. The communication apparatus according to claim 6, wherein the first condition includes that a size sum of the P number of CSIs is equal to or more than M, the second condition includes that a size sum of the P number of CSIs is less than M, P is the same as Q, R is a number of CSIs, which has the highest priority among the P number of CSIs and a size sum of CSIs of maximum integer being equal to or less than S, M is a minimum size of CSI allowed for simultaneous transmission through the first physical channel, and S is an integer less than M determined in accordance with capacity of the second physical channel.]

[10. The communication apparatus according to claim 6, wherein the first condition includes that a size sum of the P number of CSIs is more than L, the second condition includes that a size sum of the P number of CSIs is less than M, P is greater than Q, Q is a number of CSIs, which has the highest priority among the P number of CSIs and a size sum of CSIs of maximum integer being equal to or less than L, R is a number of CSIs, which has the highest priority among the P number of CSIs and a size sum of CSIs of maximum integer being equal to or less than S, L is a maximum size of CSI allowed for simultaneous transmission through the first physical channel, M is a minimum size of CSI allowed for simultaneous transmission through the first physical channel, and S is an integer less than M determined in accordance with capacity of the second physical channel.]

*11. A method for a communication apparatus to report channel state information (CSI) in a wireless communication system that supports carrier aggregation, the method comprising:*

*configuring a plurality of downlink component carriers (DL CCs), and*

*performing CSI transmission through a physical uplink channel in a time duration where transmission times of CSIs related with at least one of the plurality of DL CCs are overlapped with one another,*

*wherein based on a total bit size of the CSIs being greater than a reference value, the CSI transmission includes one or more CSIs selected from the CSIs according to a CSI priority rule so that a total bit size of the one or more CSIs is not greater than the reference value.*

*12. The method of claim 11, wherein based on the total bit size of the CSIs being equal to or less than the reference value, the CSI transmission includes all of the CSIs.*

*13. The method of claim 11, wherein the physical uplink channel includes a physical uplink control channel (PUCCH).*

*14. The method of claim 13, wherein the step of performing includes performing fast fourier transforming on the one or more CSIs.*

*15. The method of claim 11, wherein based on the total bit size of the CSIs being greater than the reference value, the CSI transmission does not include remaining CSI(s) among the CSIs.*

*16. The method of claim 11, wherein when the time duration is configured for transmission of a scheduling request, a 1-bit scheduling request is transmitted with the one or more CSIs.*

*17. The method of claim 11, wherein the one or more CSIs includes two or more CSIs.*

*18. The method of claim 11, wherein the time duration includes a plurality of contiguous orthogonal frequency division multiple access (OFDMA)-based symbols.*

*19. The method of claim 11, wherein the one or more CSIs have higher CSI priorities than remaining CSI(s) among the CSIs.*

*20. The method of claim 11, wherein the reference value is a defined user equipment (UE)-specifically based on a radio resource control (RRC) signal.*

*21. A communication apparatus for use in a wireless communication system that supports carrier aggregation, the communication apparatus comprising:*

*a radio frequency (RF) unit configured to receive radio signals through a plurality of downlink component carriers (DL CCs); and*

*a processor, the processor being connected with the RF unit and configured to perform channel state information (CSI) transmission through a physical uplink channel in a time duration where transmission times of CSIs related with at least one of the plurality of DL CCs are overlapped with one another,*

*wherein based on a total bit size of the CSIs being greater than a reference value, the CSI transmission includes one or more CSIs selected from the CSIs according to a CSI priority rule so that a total bit size of the one or more CSIs is not greater than the reference value.*

*22. The communication apparatus of claim 21, wherein based on the total bit size of the CSIs being equal to or less than the reference value, the CSI transmission includes all of the CSIs.*

*23. The communication apparatus of claim 21, wherein the physical uplink channel includes a physical uplink control channel (PUCCH).*

*24. The communication apparatus of claim 23, wherein the processor is further configured to perform fast fourier transforming on the one or more CSIs.*

*25. The communication apparatus of claim 21, wherein based on the total bit size of the CSIs being greater than the reference value, the CSI transmission does not include remaining CSI(s) among the CSIs.*

*26. The communication apparatus of claim 21, wherein when the time duration is configured for transmission of a scheduling request, a 1-bit scheduling request is transmitted with the one or more CSIs.*

*27. The communication apparatus of claim 21, wherein the one or more CSIs includes two or more CSIs.*

*28. The communication apparatus of claim 21, wherein the time duration includes a plurality of contiguous orthogonal frequency division multiple access (OFDMA)-based symbols.*

*29. The communication apparatus of claim 21, wherein the one or more CSIs have higher CSI priorities than remaining CSI(s) among the CSIs.*

*30. The communication apparatus of claim 21, wherein the reference value is a defined user equipment (UE)-specifically based on a radio resource control (RRC) signal.*

* * * * *